(12) United States Patent
Okada

(10) Patent No.: US 9,151,938 B2
(45) Date of Patent: Oct. 6, 2015

(54) ZOOM LENS AND IMAGE PICKUP DEVICE INCLUDING THE SAME

(71) Applicant: CANON KABUSHIKI KAISHA, Tokyo (JP)

(72) Inventor: Takashi Okada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 14/218,012

(22) Filed: Mar. 18, 2014

(65) Prior Publication Data

US 2014/0313591 A1    Oct. 23, 2014

(30) Foreign Application Priority Data

Apr. 18, 2013    (JP) ................. 2013-087524

(51) Int. Cl.
*G02B 15/14*    (2006.01)
*G02B 15/173*    (2006.01)

(52) U.S. Cl.
CPC .............. *G02B 15/173* (2013.01); *G02B 15/14* (2013.01)

(58) Field of Classification Search
CPC ................................ G02B 15/173; G02B 15/14
See application file for complete search history.

(56) References Cited

U.S. PATENT DOCUMENTS

| | | | |
|---|---|---|---|
| 6,978,089 B2 | 12/2005 | Nomura et al. | |
| 7,643,228 B2 * | 1/2010 | Ishibashi | 359/793 |
| 7,738,181 B2 | 6/2010 | Sato | |
| 7,859,766 B2 * | 12/2010 | Sakai | 359/687 |
| 7,924,509 B2 * | 4/2011 | Ohtake et al. | 359/687 |
| 7,961,403 B2 * | 6/2011 | Sakai | 359/687 |
| 2011/0234882 A1 | 9/2011 | Adachi et al. | |

\* cited by examiner

*Primary Examiner* — David N Spector
(74) *Attorney, Agent, or Firm* — Carter, DeLuca, Farrell & Schmidt, LLP

(57) ABSTRACT

A zoom lens includes, in order from an object side to an image side, first to fourth lens units having positive, negative, positive and positive refractive powers, respectively. The intervals between adjacent lens units vary during zooming. The first lens is disposed nearer to an object at the telephoto end than at the wide angle end. Each of the first lens unit to the fourth lens unit includes at least one negative lens. The lens total length Lt, the focal length ft, the mean value N2an of the refractive indices of materials of negative lenses of the second lens unit, the mean value NAan of the refractive indices of materials of the negative lenses included in the entire system, and the mean value NAap of the refractive indices of materials of the positive lenses included in the entire system are appropriately configured.

8 Claims, 13 Drawing Sheets

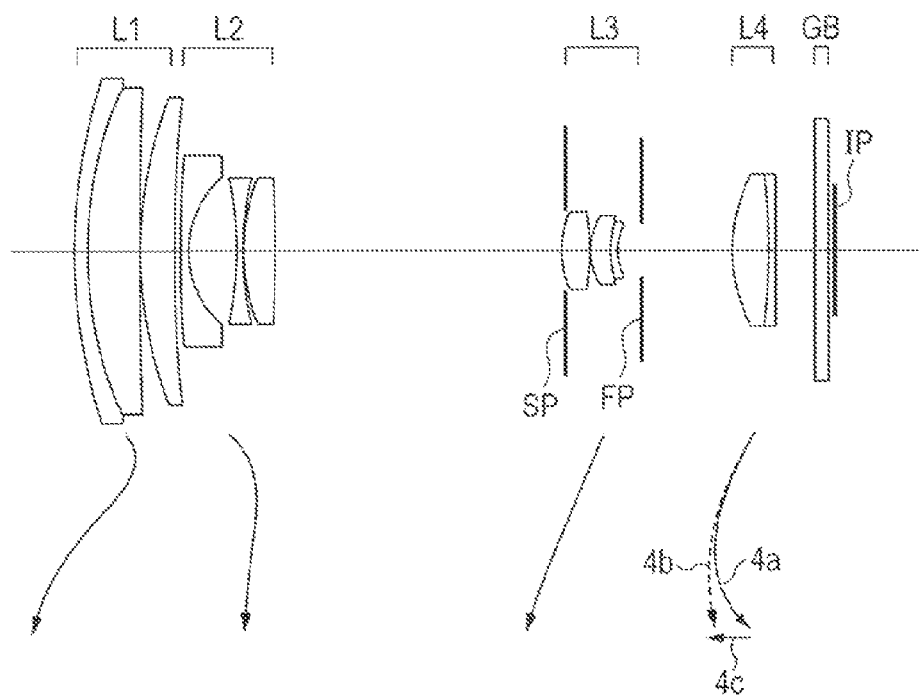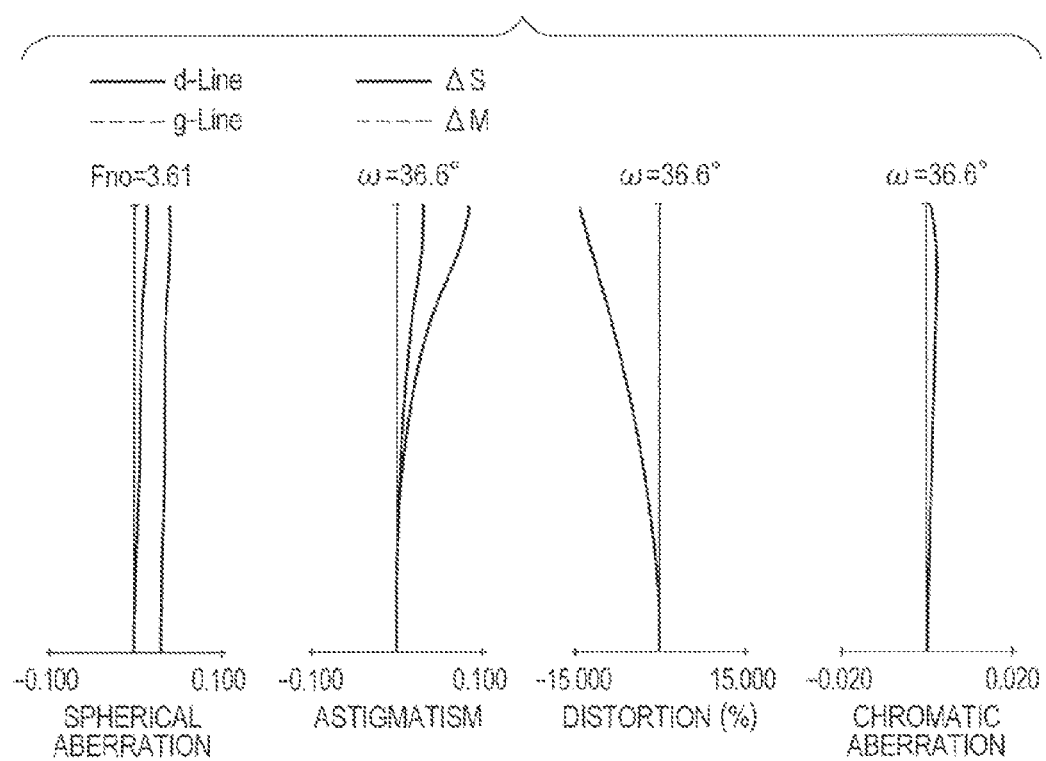

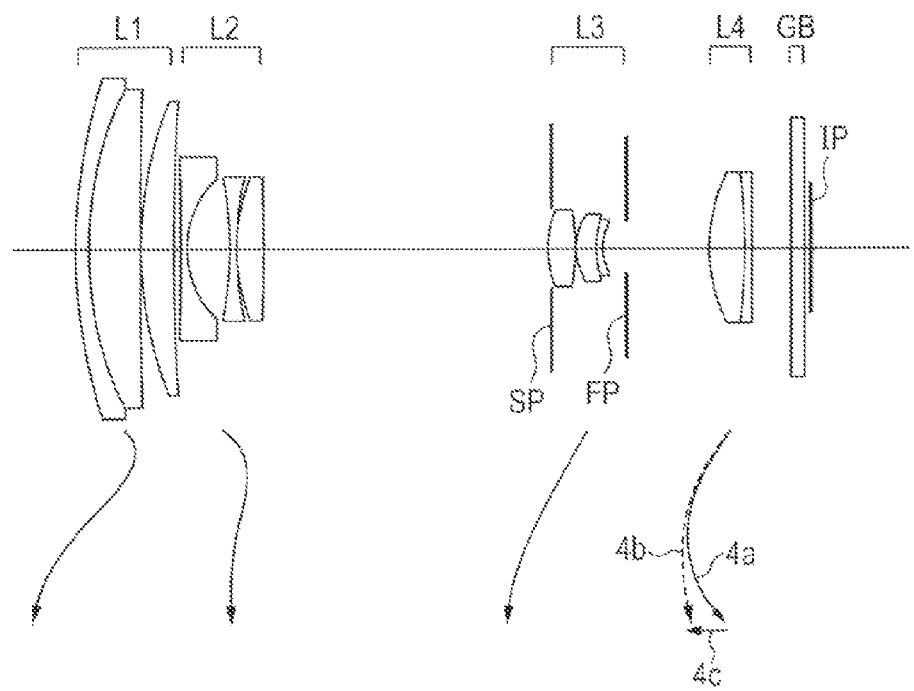
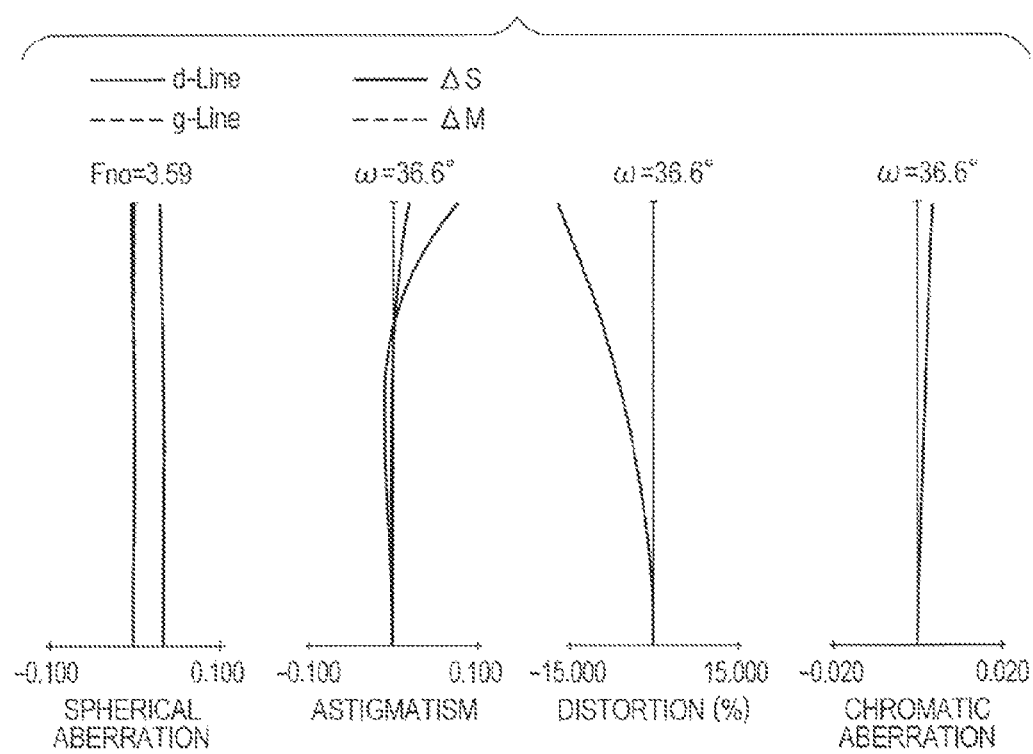

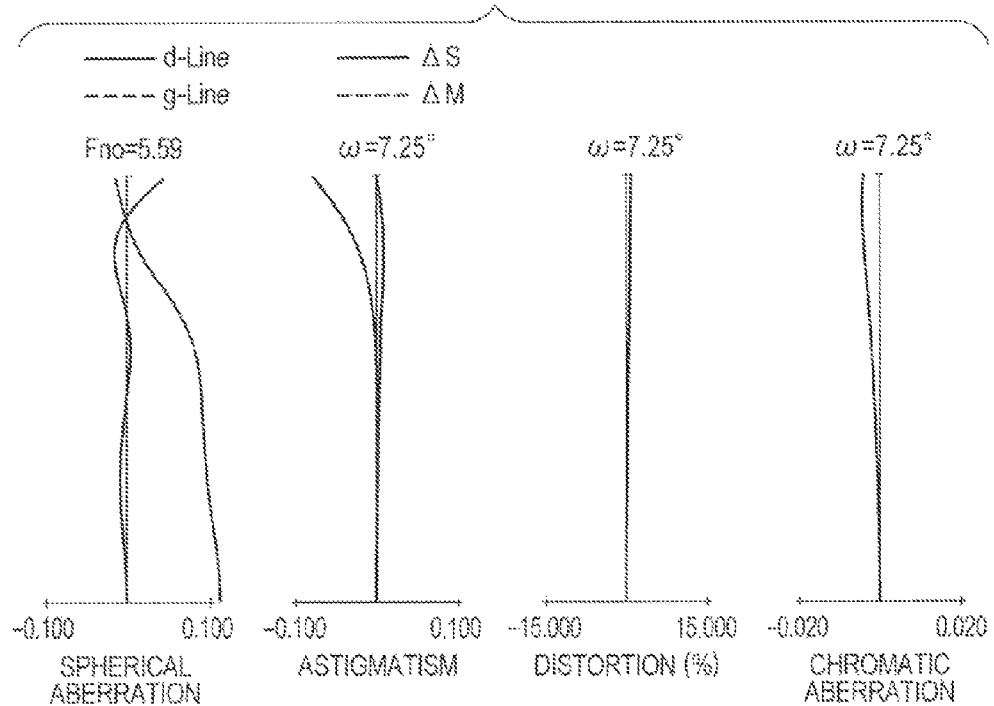
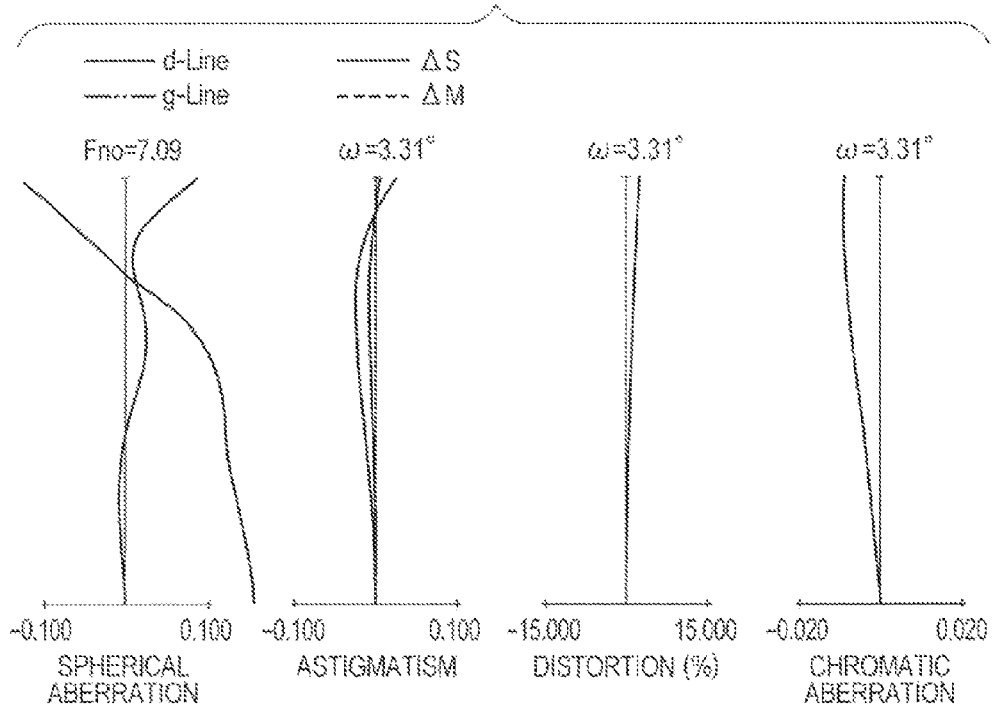

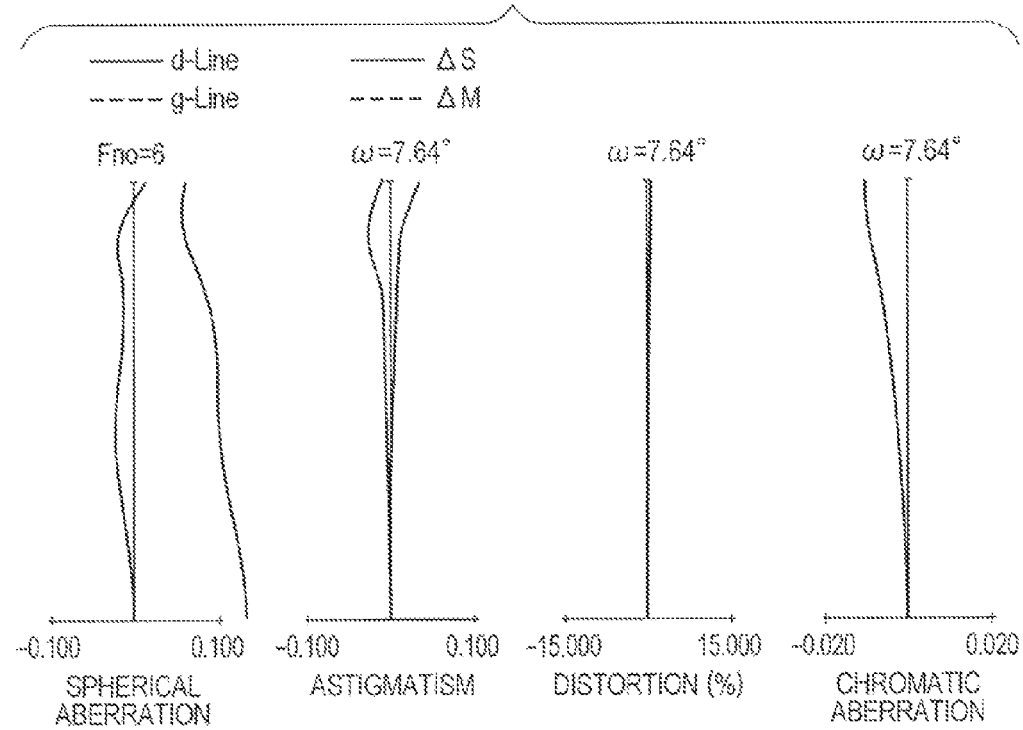
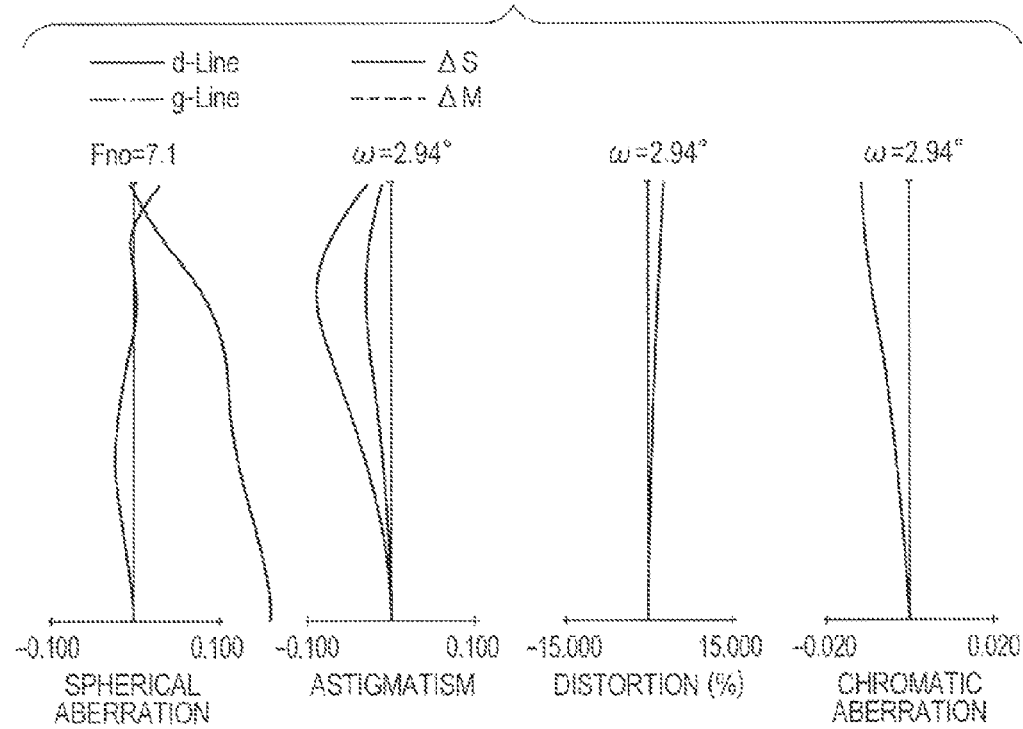

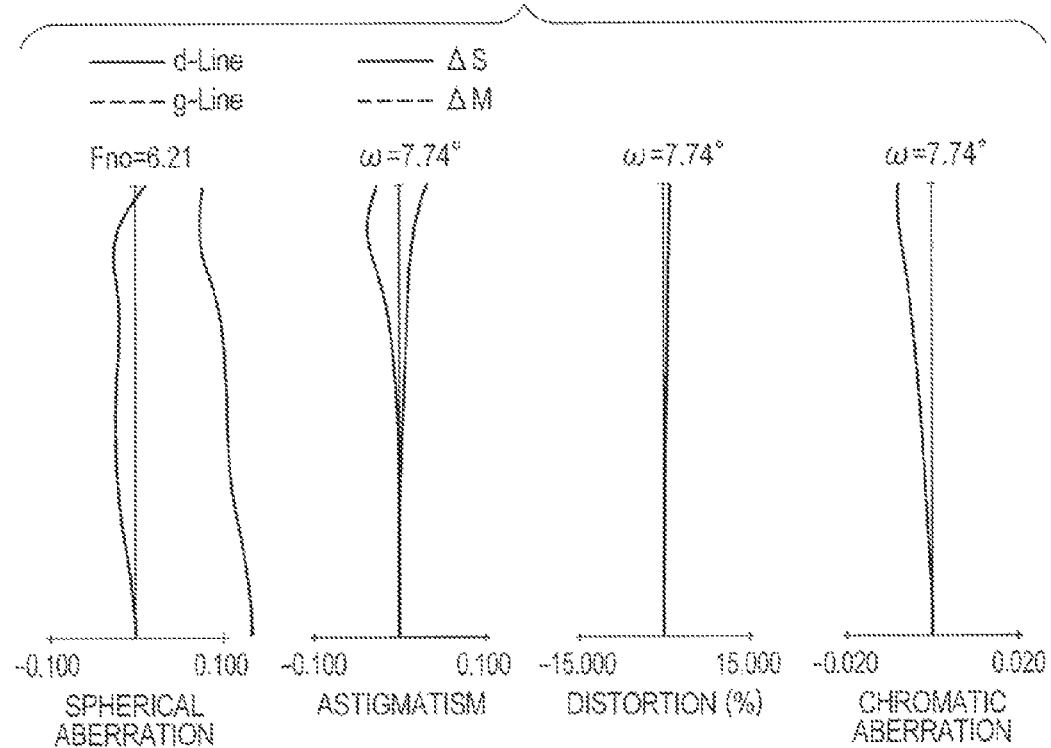
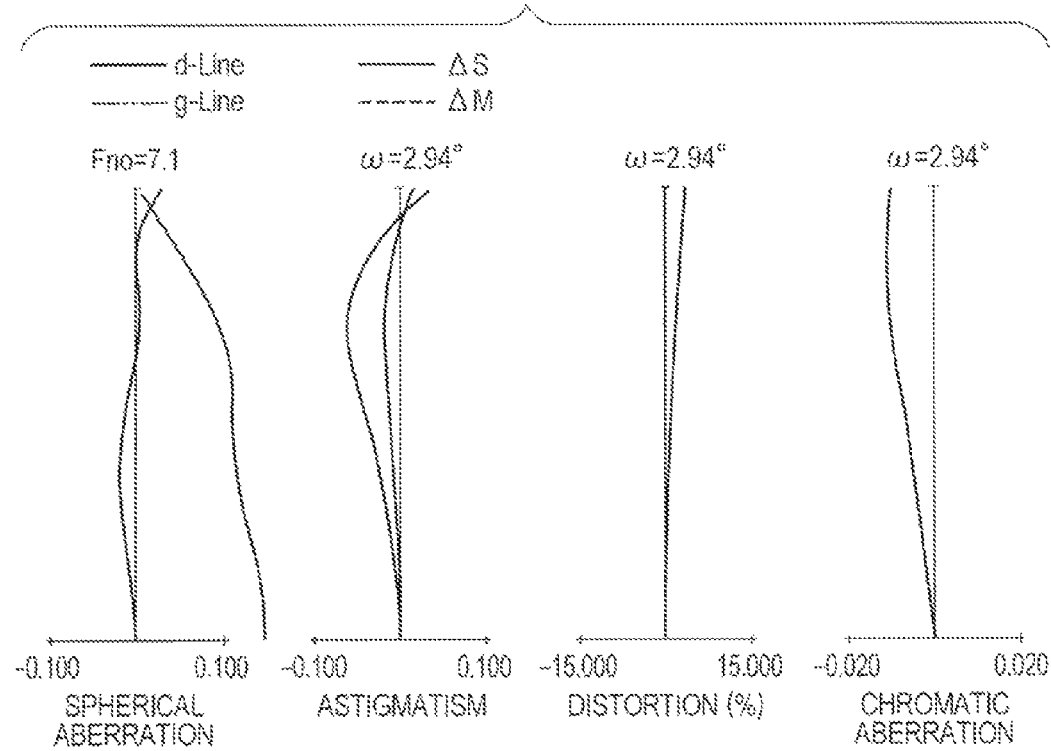

ZOOM LENS AND IMAGE PICKUP DEVICE INCLUDING THE SAME

BACKGROUND OF THE INVENTION

1. Field of the Invention

The present invention relates to a zoom lens and an image pickup device including the same, and is, for instance, suitable for an image pickup optical system of a video camera, a digital still camera, a TV camera, a monitoring camera, or a silver halide photographic camera.

2. Description of the Related Art

An image pickup optical system adopted in an image pickup device is required to have a high zoom ratio and be a small zoom lens. The system is also required to be a retractable zoom lens that contracts the intervals between lens units in a non-imaging state so as to be different from intervals in an imaging state, and allow the thickness of the image pickup device to be reduced. U.S. Patent Application Laid-Open No. 2011/0234882 and U.S. Pat. No. 7,738,181 disclose four-unit zoom lenses that include, in order from an object side to an image side: a first lens unit having a positive refractive power; a second lens unit having a negative refractive power; a third lens unit having a positive refractive power; and a fourth lens unit having a positive refractive power.

U.S. Pat. No. 6,978,089 discloses a zoom lens that retracts a part of lens units away from the optical axis in a retracted state so as to reduce the thickness of the entire device during a non-imaging state.

SUMMARY OF THE INVENTION

A zoom lens includes, in order from an object side to an image side: a first lens unit having a positive refractive power; a second lens unit having a negative refractive power; a third lens unit having a positive refractive power; and a fourth lens unit having a positive refractive power, wherein intervals between adjacent lens units vary during zooming, and the first lens unit moves so as to be disposed nearer to an object at a telephoto end than at a wide angle end, and wherein each of the first lens unit to the fourth lens unit has at least one negative lens, and conditional expressions $$0.60 < Lt/ft < 0.95$$

$$1.84 < N2an < 2.00$$

$$0.22 < NAan - NAap < 0.40$$

are satisfied where Lt is a lens total length at the telephoto end, ft is a focal length of an entire system at the telephoto end, N2an is a mean value of refractive indices of materials of negative lenses included in the second lens unit, NAan is a mean value of refractive indices of materials of negative lenses included in the entire system, and NAap is a mean value of refractive indices of materials of positive lenses included in the entire system.

Further features of the present invention will become apparent from the following description of exemplary embodiments with reference to the attached drawings.

BRIEF DESCRIPTION OF THE DRAWINGS

FIG. 1 is a lens sectional view of a zoom lens of Embodiment 1 of the present invention at the wide angle end.

FIG. 2A is aberration diagrams of a zoom lens of Numerical Example 1 corresponding to Embodiment 1 of the present invention at the wide angle end.

FIG. 3 is a lens sectional view of a zoom lens of Embodiment 2 of the present invention at the wide angle end.

FIG. 4A is aberration diagrams of the zoom lens of Numerical Example 2 corresponding to Embodiment 2 of the present invention at the wide angle end.

FIG. 6B is aberration diagrams of the zoom lens of Numerical Example 3 corresponding to Embodiment 3 of the present invention at an intermediate zoom position.

FIG. 6C is aberration diagrams of the zoom lens of Numerical Example 3 corresponding to Embodiment 3 of the present invention at the telephoto end.

FIG. 8B is aberration diagrams of the zoom lens of Numerical Example 4 corresponding to Embodiment 4 of the present invention at an intermediate zoom position.

FIG. 8C is aberration diagrams of the zoom lens of Numerical Example 4 corresponding to Embodiment 4 of the present invention at the telephoto end.

FIG. 12B is aberration diagrams of the zoom lens of Numerical Example 6 corresponding to Embodiment 6 of the present invention at an intermediate zoom position.

FIG. 12C is aberration diagrams of the zoom lens of Numerical Example 6 corresponding to Embodiment 6 of the present invention at the telephoto end.

DESCRIPTION OF THE EMBODIMENTS

Preferred embodiments of the present invention will now be described in detail in accordance with the accompanying drawings.

Favorable embodiments of the present invention are hereinafter described with reference to the accompanying drawings. A zoom lens of the present invention includes, in order from an object side to an image side: a first lens unit having a positive refractive power; a second lens unit having a negative refractive power; a third lens unit having a positive refractive power; and a fourth lens unit having a positive refractive power. This zoom lens varies the intervals between the lens units for zooming. In the zoom lens of the present invention, each of the first to fourth lens units includes at least one lens having a negative refractive power (negative lens).

Figure 2B:
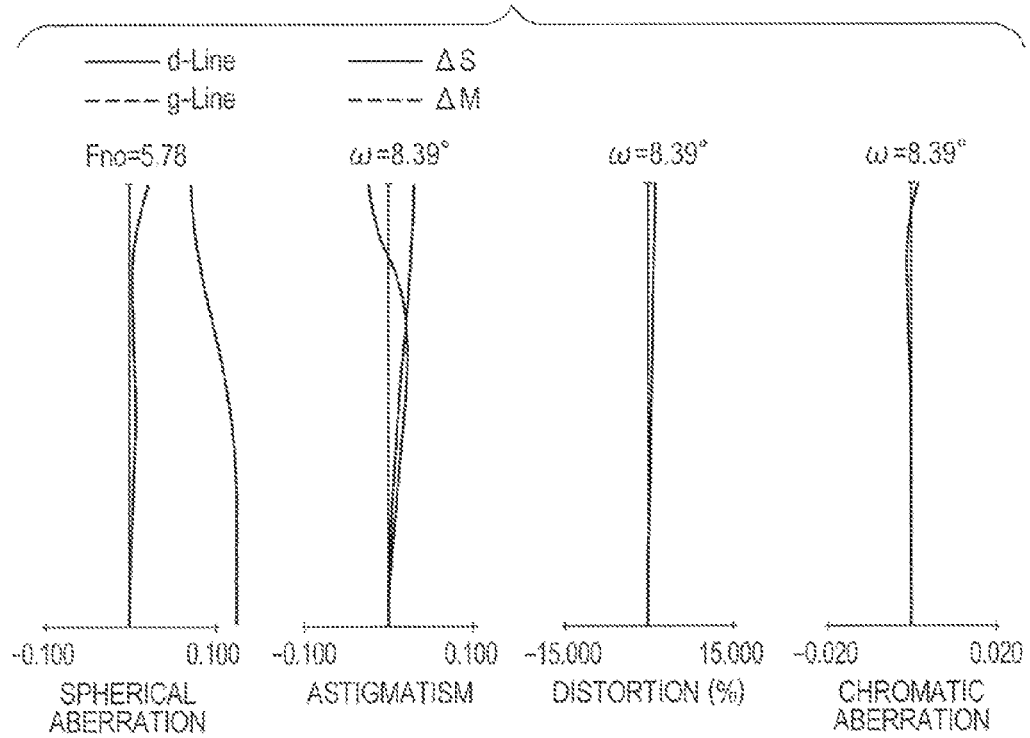
FIG. 2B is aberration diagrams of the zoom lens of Numerical Example 1 corresponding to Embodiment 1 of the present invention at an intermediate zoom position.
Figure 2C:
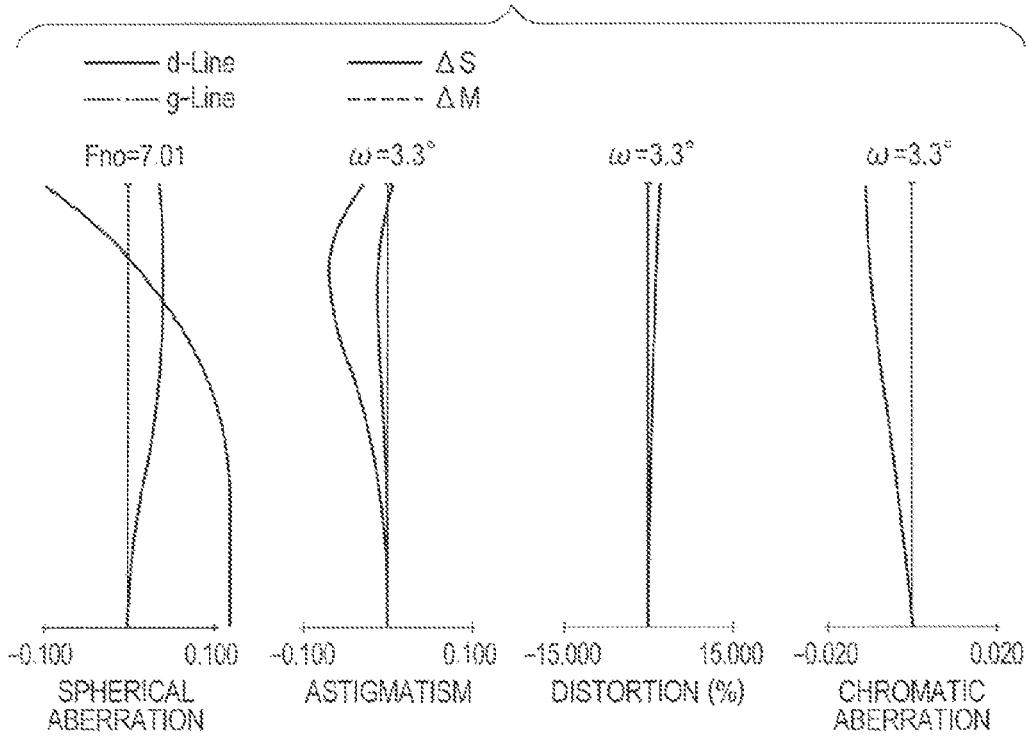
FIG. 2C is aberration diagrams of the zoom lens of Numerical Example 1 corresponding to Embodiment 1 of the present invention at the telephoto end.

FIG. 1 is a lens sectional view of a zoom lens of Embodiment 1 of the present invention at the wide angle end (short focal length end). FIGS. 2A, 2B and 2C are aberration diagrams of the zoom lens of Embodiment 1 at the wide angle end, an intermediate zoom position and the telephoto end (long focal length end), respectively. Embodiment 1 is a zoom lens having a zoom ratio of 15.15 and an f-number approximately ranging from 3.61 to 7.01.

Figure 4B:
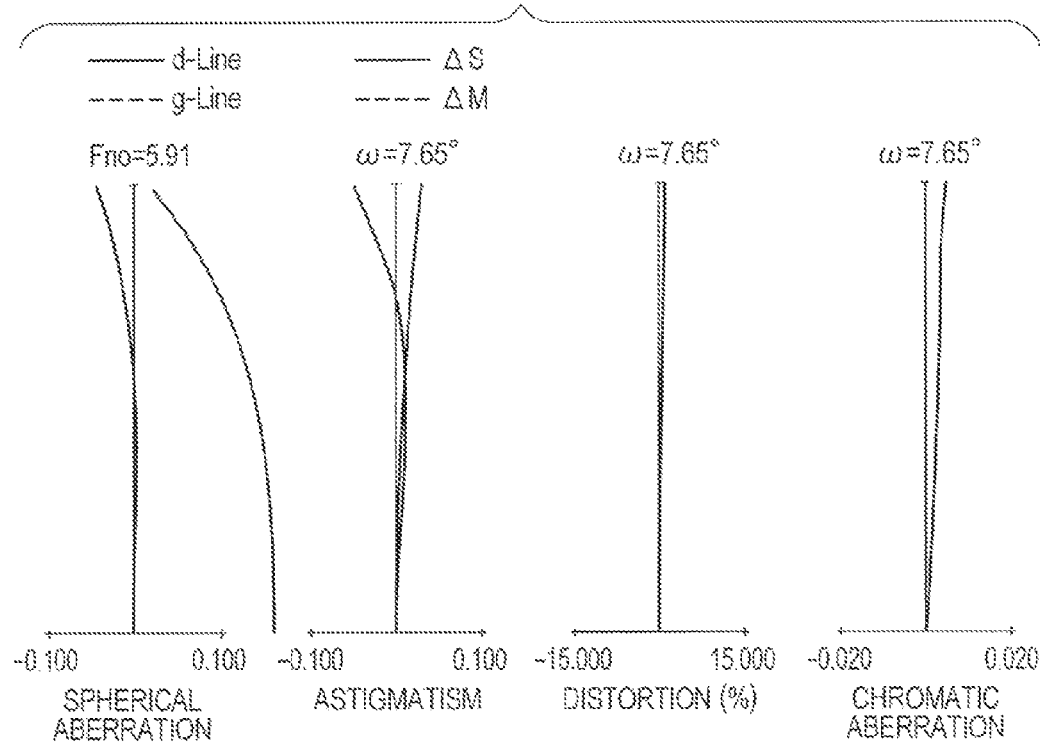
FIG. 4B is aberration diagrams of the zoom lens of Numerical Example 2 corresponding to Embodiment 2 of the present invention at an intermediate zoom position.
Figure 4C:
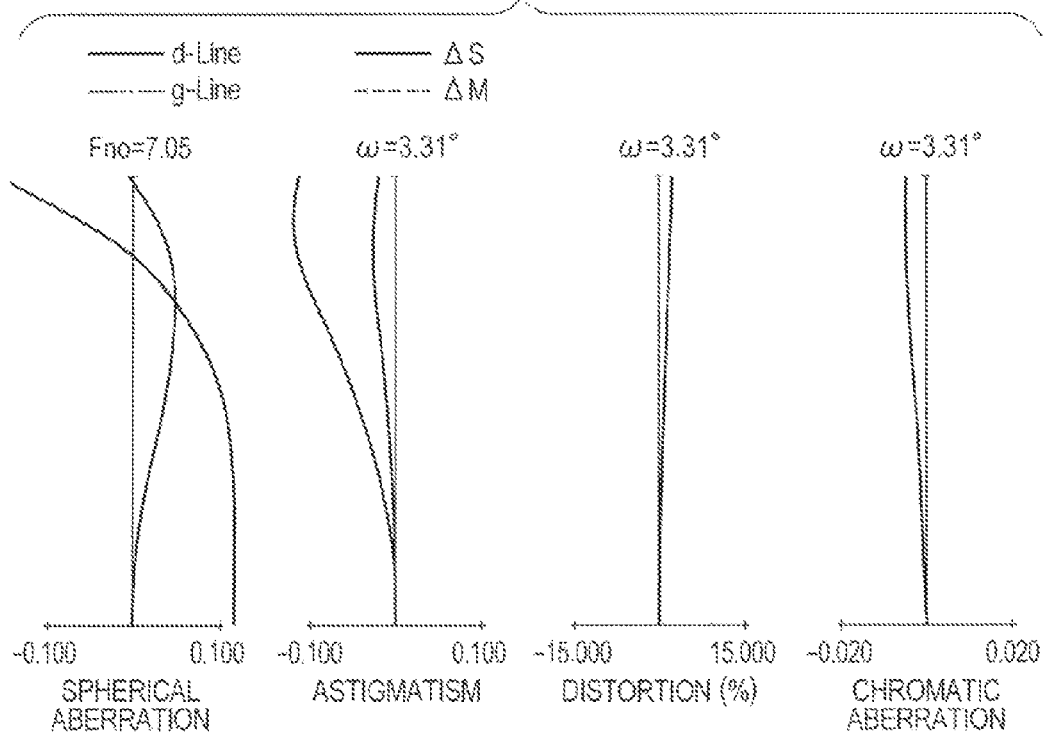
FIG. 4C is aberration diagrams of the zoom lens of Numerical Example 2 corresponding to Embodiment 2 of the present invention at the telephoto end.

FIG. 3 is a lens sectional view of a zoom lens of Embodiment 2 of the present invention at the wide angle end. FIGS. 4A, 4B and 4C are aberration diagrams of the zoom lens of Embodiment 2 at the wide angle end, an intermediate zoom position and the telephoto end, respectively. Embodiment 2 is a zoom lens having a zoom ratio of 15.14 and an f-number approximately ranging from 3.59 to 7.05.

Figure 5:
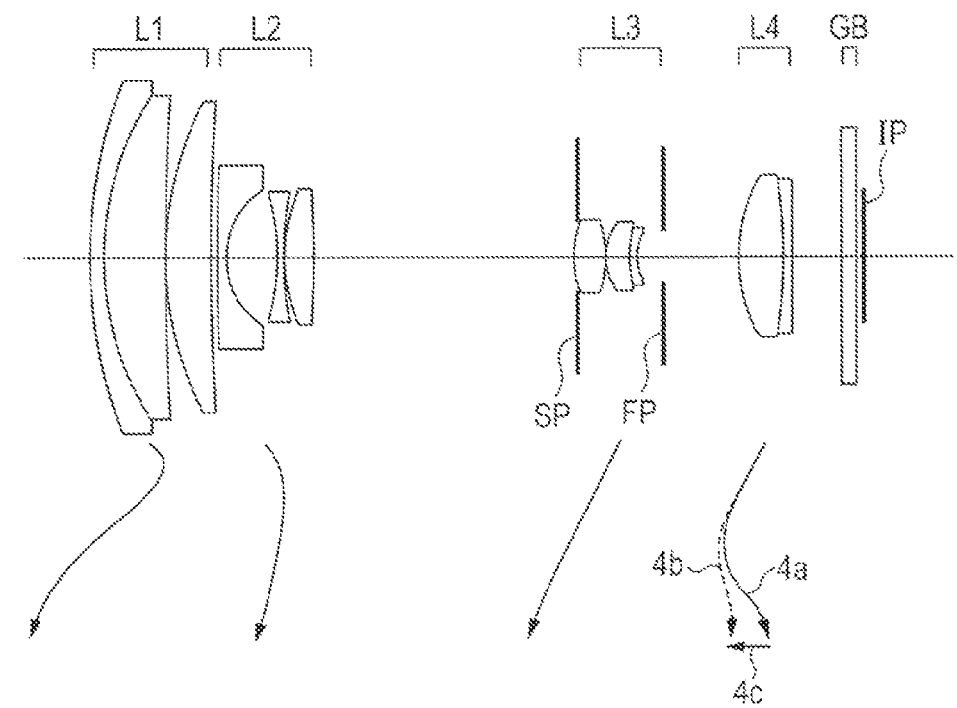
FIG. 5 is a lens sectional view of a zoom lens of Embodiment 3 of the present invention at the wide angle end.
Figure 6A:
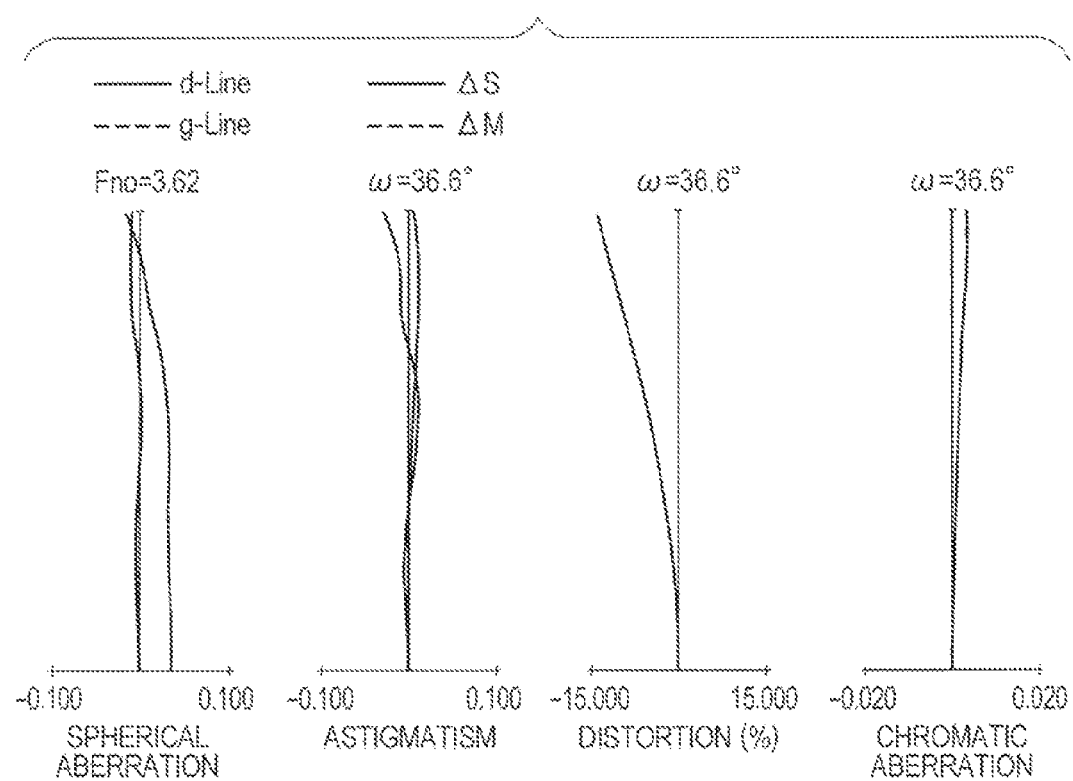
FIG. 6A is aberration diagrams of the zoom lens of Numerical Example 3 corresponding to Embodiment 3 of the present invention at the wide angle end.

FIG. 5 is a lens sectional view of a zoom lens of Embodiment 3 of the present invention at the wide angle end. FIGS. 6A, 6B and 6C are aberration diagrams of the zoom lens of Embodiment 3 at the wide angle end, an intermediate zoom position and the telephoto end, respectively. Embodiment 3 is a zoom lens having a zoom ratio of 15.13, and an f-number approximately ranging from 3.62 to 7.09.

Figure 7:
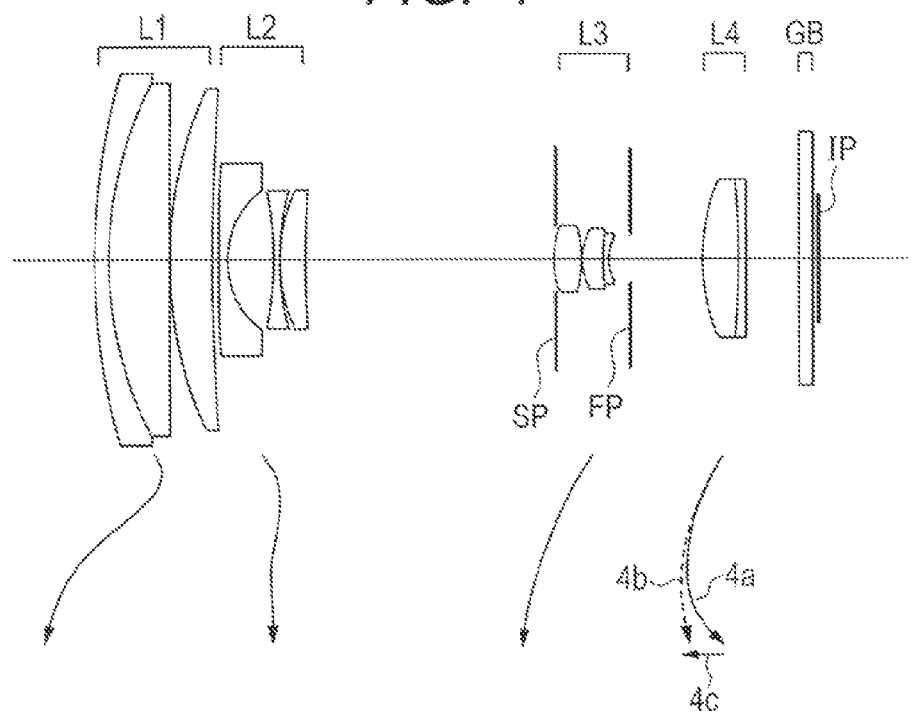
FIG. 7 is a lens sectional view of a zoom lens of Embodiment 4 of the present invention at the wide angle end.
Figure 8A:
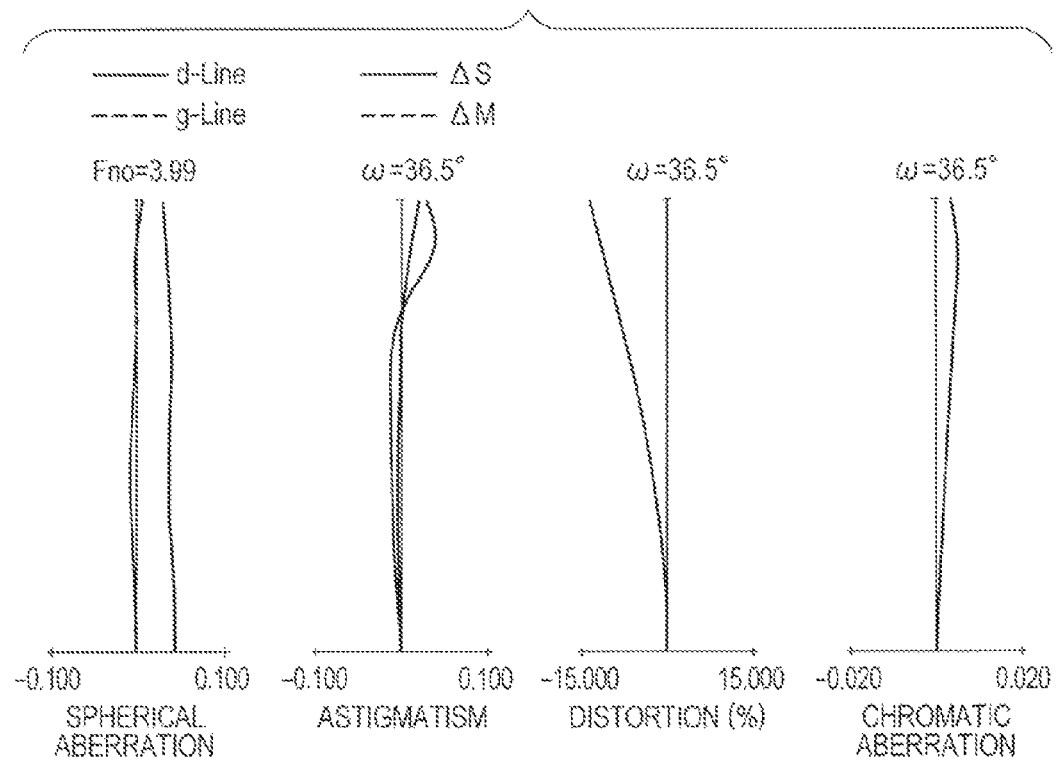
FIG. 8A is aberration diagrams of the zoom lens of Numerical Example 4 corresponding to Embodiment 4 of the present invention at the wide angle end.

FIG. 7 is a lens sectional view of a zoom lens of Embodiment 4 of the present invention at the wide angle end. FIGS. 8A, 8B and 8C are aberration diagrams of the zoom lens of Embodiment 4 at the wide angle end, an intermediate zoom position and the telephoto end, respectively. Embodiment 4 is a zoom lens having a zoom ratio of 17.00 and an f-number approximately ranging from 3.99 to 7.10.

Figure 9:
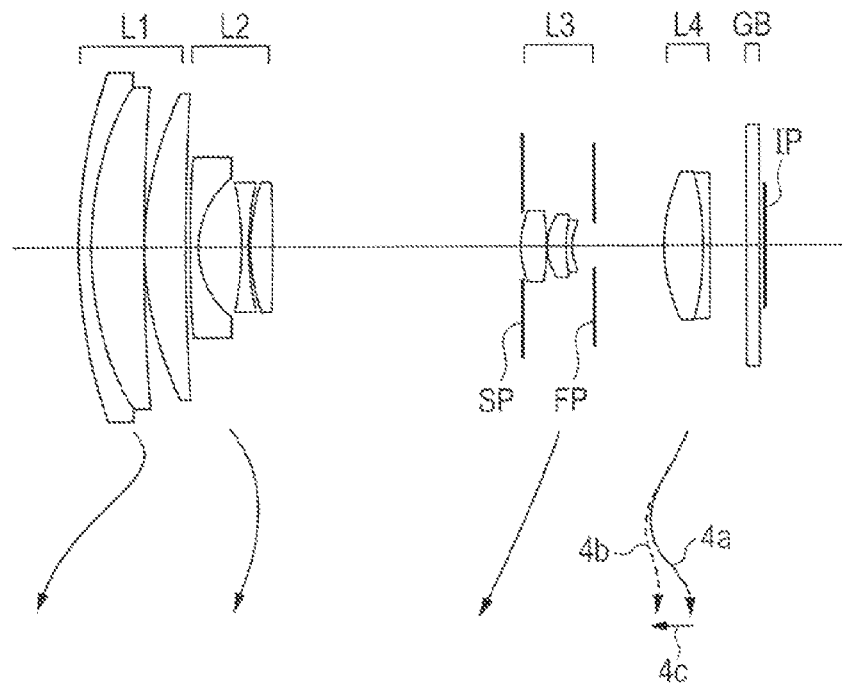
FIG. 9 is a lens sectional view of a zoom lens of Embodiment 5 of the present invention at the wide angle end.
Figure 10A:
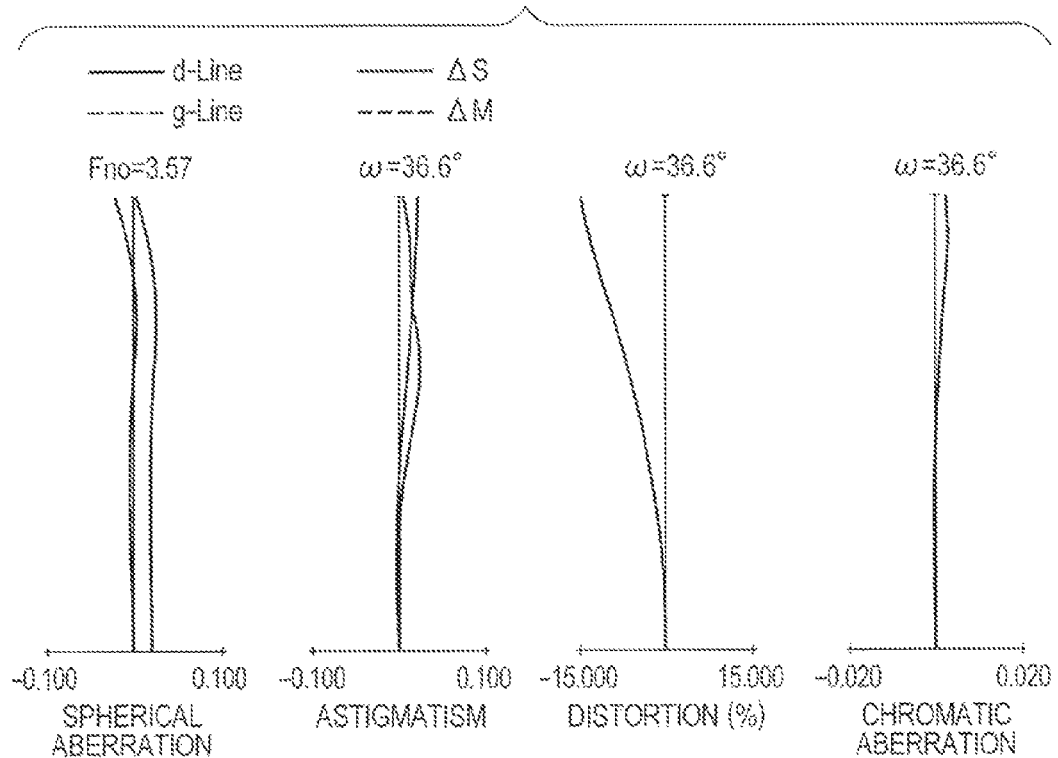
FIG. 10A is aberration diagrams of the zoom lens of Numerical Example 5 corresponding to Embodiment 5 of the present invention at the wide angle end.
Figure 10B:
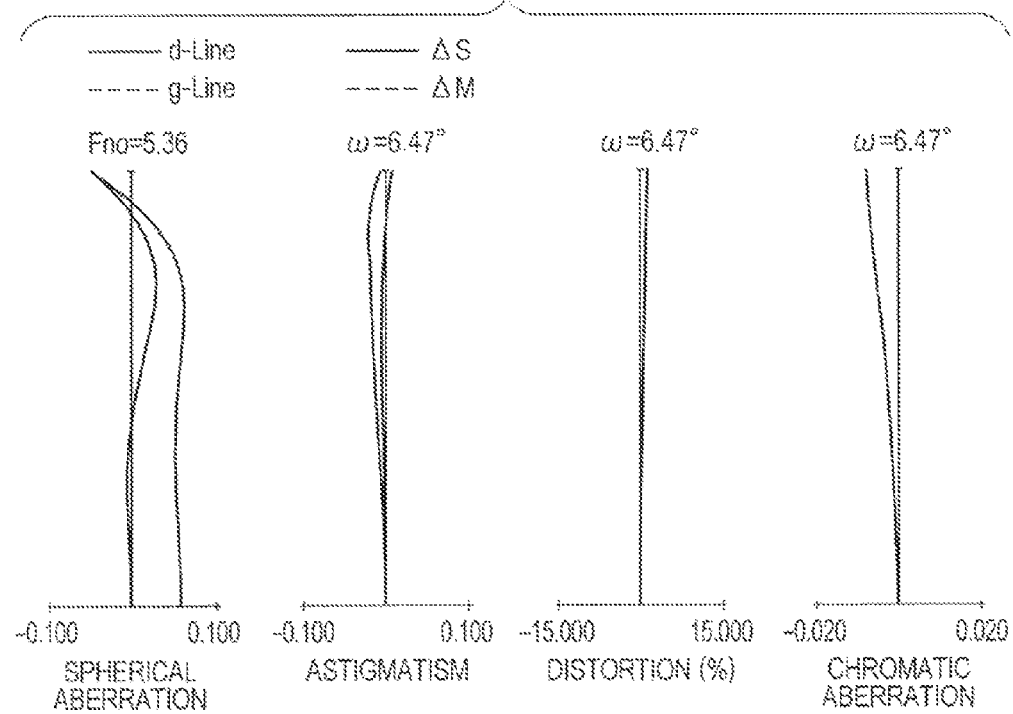
FIG. 10B is aberration diagrams of the zoom lens of Numerical Example 5 corresponding to Embodiment 5 of the present invention at an intermediate zoom position.
Figure 10C:
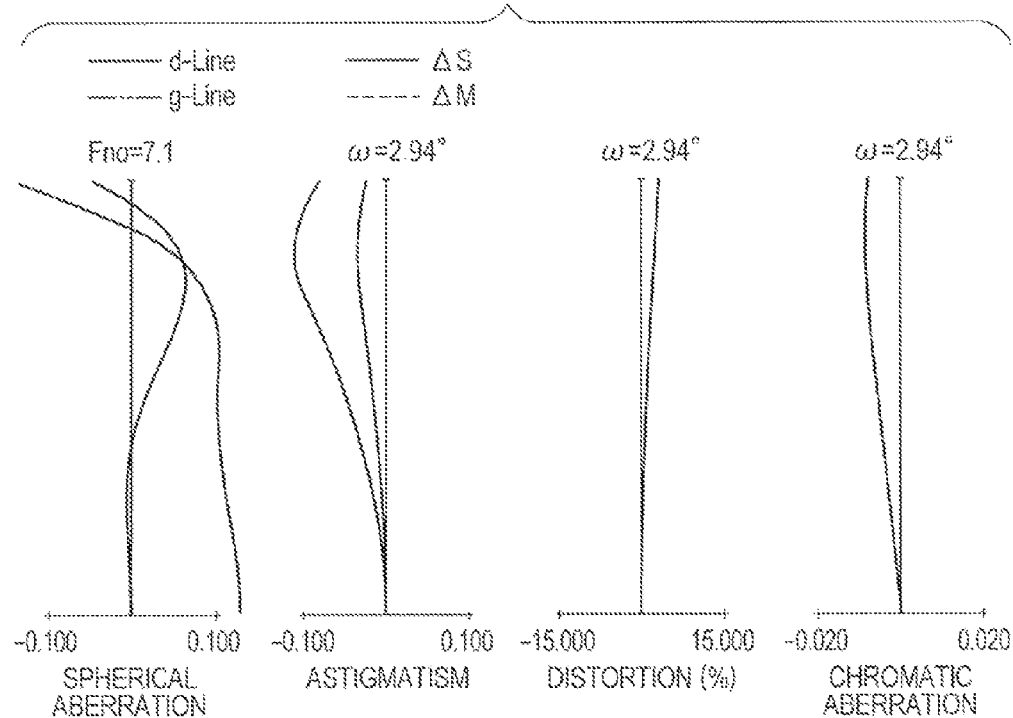
FIG. 10C is aberration diagrams of the zoom lens of Numerical Example 5 corresponding to Embodiment 5 of the present invention at the telephoto end.

FIG. 9 is a lens sectional view of a zoom lens of Embodiment 5 of the present invention at the wide angle end. FIGS. 10A, 10B and 10C are aberration diagrams of the zoom lens of Embodiment 5 at the wide angle end, an intermediate zoom position and the telephoto end, respectively. Embodiment 5 is a zoom lens having a zoom ratio of 16.99 and an f-number approximately ranging from 3.57 to 7.10.

Figure 11:
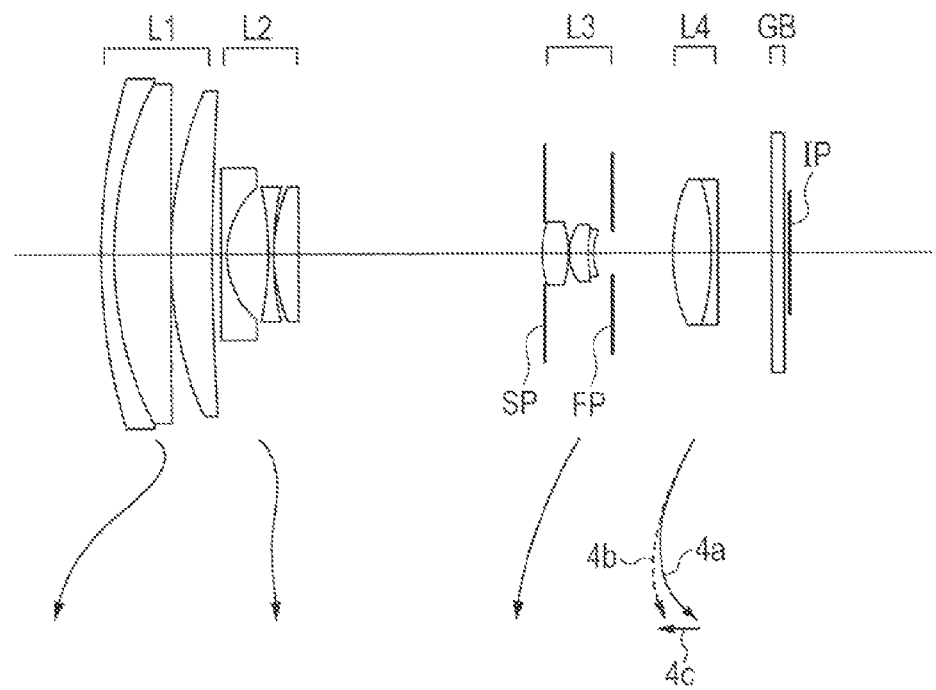
FIG. 11 is a lens sectional view of a zoom lens of Embodiment 6 of the present invention at the wide angle end.
Figure 12A:
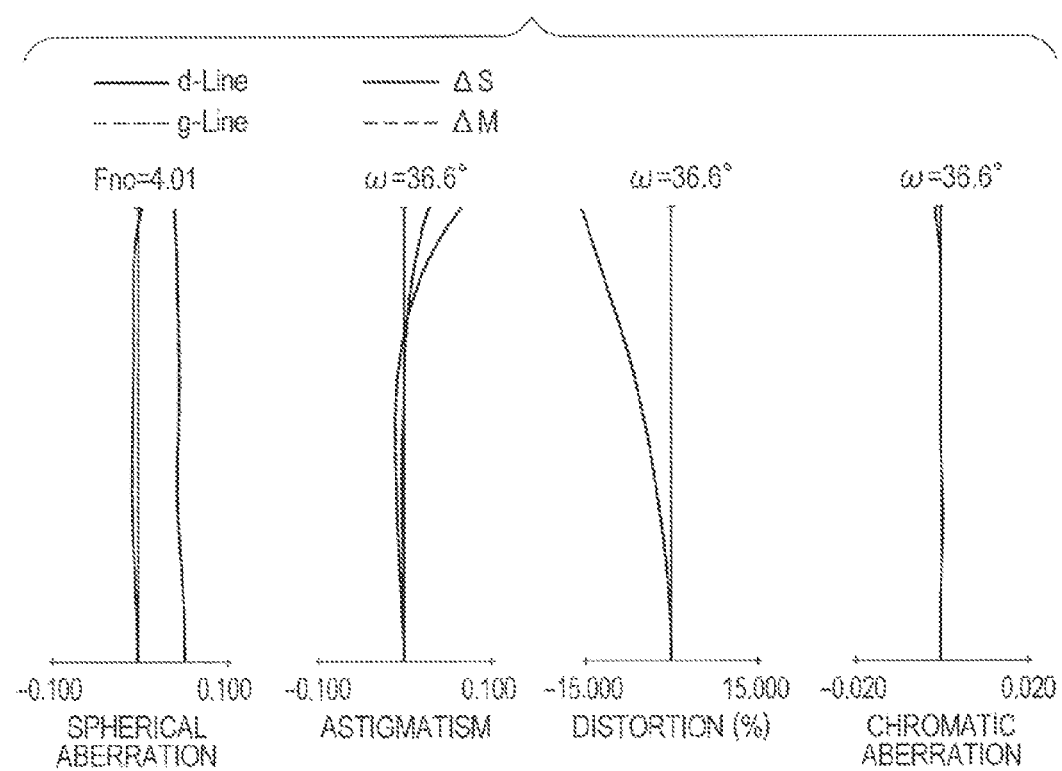
FIG. 12A is aberration diagrams of the zoom lens of Numerical Example 6 corresponding to Embodiment 6 of the present invention at the wide angle end.

FIG. 11 is a lens sectional view of a zoom lens of Embodiment 6 of the present invention at the wide angle end. FIGS. 12A, 12B and 12C are aberration diagrams of the zoom lens of Embodiment 6 at the wide angle end, an intermediate zoom position and the telephoto end, respectively. Embodiment 6 is a zoom lens having a zoom ratio of 17.04 and an f-number approximately ranging from 4.01 to 7.10.

Figure 13:
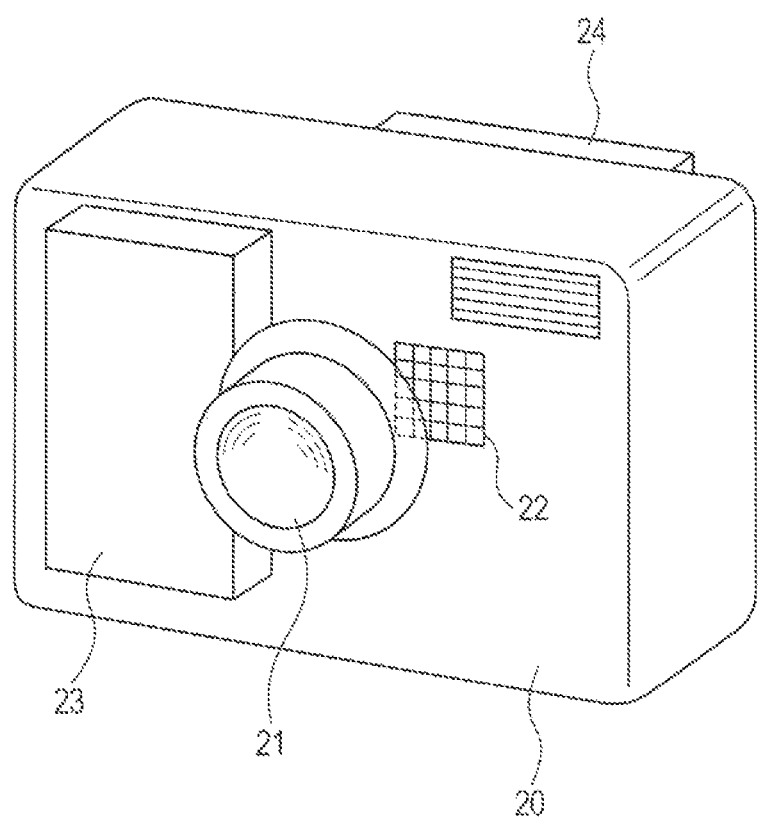
FIG. 13 is a schematic diagram of an image pickup device of the present invention.

FIG. 13 is a schematic diagram illustrating principal parts of a camera (image pickup device) including a zoom lens of the present invention. The zoom lenses of the embodiments are imaging lens systems adopted in image pickup devices, such as video cameras, digital cameras and silver halide film cameras. In the lens sectional views, the left indicates a subject side (object side) (front), and the right indicates an image side (rear). In the lens sectional views, the order i for a lens unit is taken from the object side. Li denotes the i-th lens unit.

The lens sectional view illustrates a first lens unit L1 having a positive refractive power, a second lens unit L2 having a negative refractive power; a third lens unit L3 having a positive refractive power; and a fourth lens unit L4 having a negative refractive power. The zoom lenses of the embodiments are four-unit zoom lenses. An aperture stop SP is arranged between the object side apex of a lens G31, which is nearest to an object in the third lens unit L3, and the intersection between the object-side surface of the lens G31 and a peripheral portion (edge portion).

A flare stop FP is arranged on an image side of the third lens unit L3, and shields unnecessary light. An optical block GB corresponds to any of an optical filter, a faceplate, a crystal low-pass filter and an infrared cut filter. An image plane IP is disposed on an image plane of a solid image pickup element (photo-electric conversion element), such as a CCD sensor or a CMOS sensor, in the case of use as an imaging optical system of a video camera or a digital still camera. On the image plane IP, a photosensitive surface corresponding to a film surface is arranged in the case of a silver halide film camera.

Arrows indicate movement loci of the respective lens units during zooming from the wide angle end to the telephoto end. The arrows also indicate movement directions during focusing from infinity to a short distance. In the spherical aberration diagram, a d-line is represented by a solid line, and a g-line is represented by a chain double-dashed line. In the astigmatism diagram, a meridional image plane ΔM is represented by a dotted line, and a sagittal image plane ΔS is represented by a solid line. A lateral chromatic aberration is represented for a g-line. A half angle of view ω (degree) (a value half an imaging angle of view), and an f-number Fno are also illustrated. In each of the following embodiments, the wide angle end and the telephoto end are zoom positions in the case where a magnification lens unit is disposed at the respective ends of a range where the unit can mechanically move on the optical axis.

In each embodiment, during zooming from the wide angle end to the telephoto end, the first, second, third and fourth lens units L1, L2, L3 and L4 move as indicated by the respective arrows. More specifically, during zooming from the wide angle end to the telephoto end, the first lens unit L1 (non-linearly) moves along a locus convex toward an image. The second lens unit L2 moves along a locus convex toward the image. The third lens unit L3 moves towards the object. The fourth lens unit L4 moves along a locus convex toward the object.

In each embodiment, during zooming, both the first lens unit L1 and the third lens unit L3 move so as to be disposed nearer to the object at the telephoto end than at the wide angle end. This disposition reduces the lens total length (the length on the optical axis from the first lens surface to the image plane) at the wide angle end to facilitate reduction in the size of the front lens effective diameter, while achieving a high zoom ratio.

Each embodiment adopts a rear focus type that performs focusing by moving the fourth lens unit L4 on the optical axis. Focusing from infinity to a short distance at the telephoto end is performed by outward movement as indicated by the arrow 4c illustrated in the lens sectional view. The solid curve 4a and dotted curve 4b pertaining to the fourth lens unit L4 indicate movement loci for correcting image plane variation during zooming from the wide angle end to the telephoto end in the case of focusing at infinity and at a short distance, respectively.

In each embodiment, a part or the entire parts of the third lens unit L3 having a positive refractive power may be moved to have a component in a direction perpendicular to the optical axis, thereby displacing an imaging position in the direction perpendicular to the optical axis. That is, vibration isolation may be achieved that corrects blurring of a taken image (image blurring) in the case where the zoom lens vibrates (is tilted).

This configuration negates the need of additionally including any optical element, such as a variable vertex angle prism, and a vibration isolation lens unit. Accordingly, image blurring can be corrected while increase in the size of the entire optical system is prevented. Any movement system can be adopted that isolates vibration by moving a part or the entire parts of the third lens unit L3 in a direction having a component in a direction perpendicular to the optical axis. For instance, if the lens barrel structure is allowed to be complicated, a part or the entire parts of the third lens unit L3 may be rotated such that the rotation center is on the optical axis.

The first lens unit L1 can be configured so as to include a plurality of positive lenses, to reduce the lens total length at the telephoto end and favorably correct various aberrations, such as chromatic aberration, spherical aberration and coma aberration over the entire zoom range.

In each embodiment, the first lens unit L1 includes, in order from the object side to the image side: a cemented lens including a negative lens and a positive lens cemented to each other; and a positive lens. This configuration strengthens the refractive power of the first lens unit L1 and reduces the lens total length at the telephoto end, while various aberrations, such as chromatic aberration, spherical aberration and coma aberration, at the telephoto end and therearound are favorably corrected.

The second lens unit L2 includes two negative lenses, and one positive lens. The configuration with two negative lenses or less included in the second lens unit L2 favorably corrects distortion aberration and field curvature mainly at the wide angle end. In Embodiments 3 to 5, the second lens unit L2 has at least one aspheric surface. This configuration favorably corrects field curvature at the wide angle end. The third lens unit L3 includes one positive lens element, and one negative lens element. Here, the lens element is one optical block with no air interval therein. That is, this element consists of a single lens or a cemented lens.

More specifically, in each embodiment, one positive lens element of the third lens unit L3 consists of one positive lens. One negative lens element consists of a cemented lens including one positive lens and one negative lens cemented to each other. The configuration of the negative lens element consisting of a cemented lens disperses the refractive power of the positive lens, and reduces manufacturing sensitivity of each lens while favorably correcting coma aberration.

Furthermore, the positive lens element is arranged nearest to the object. This arrangement, in turn, arranges the principal position of the third lens unit L3 on an object side, and reduces the interval between the second lens unit L2 and the third lens unit L3 at the telephoto end, thereby facilitating achievement of a high zoom ratio.

In each embodiment, the negative lens element is configured to have a meniscus shape as a whole, thereby favorably correcting coma aberration during vibration isolation and at intermediate zoom positions during zooming. Furthermore, the third lens unit L3 includes at least one aspheric surface. More specifically, at least one surface of a lens that is included in the third lens unit L3 and nearest to the object is configured to have an aspheric surface shape. This configuration favorably corrects variation in spherical aberration during zooming.

In each embodiment, the fourth lens unit L4 consists of a cemented lens including a positive lens and a negative lens cemented to each other. The fourth lens unit L4 moves during focusing, and moves outward toward the object during focusing from infinity to a very short distance. In a zoom lens having at least a zoom ratio of 15, achromatism of the fourth lens unit L4 largely affects lateral chromatic aberration in a zoom intermediate range in many cases. Accordingly, the fourth lens unit L4 thus consists of the cemented lens, thereby favorably correcting variation in lateral chromatic aberration during zooming.

As described above, in each embodiment, each of the first lens unit L1 to the fourth lens unit L4 include at least one negative lens.

To achieve a zoom ratio ranging from 15 to 20 while reducing the lens total length at the telephoto end, it is desired to cause the second lens unit L2 to exert the largest effect of varying magnification. This configuration strengthens the refractive power of the second lens unit L2 and reduces the amount of movement during zooming, thereby facilitating effective reduction in the lens total length at the telephoto end while exerting a large effect of varying magnification. However, if the effect of varying magnification of the second lens unit L2 is too large, the distance from the first lens unit L1 to the aperture stop SP increases at the wide angle end and the front lens effective diameter increases.

The second lens unit L2 has the highest absolute value of the refractive power among the values of the four lens units. Accordingly, if the negative refractive power of the second lens unit L2 is large, the Petzval sum of the entire system is strong on the negative side. Accordingly, the field curvature in the entire zoom range is shifted to the over side. It is thus difficult to acquire a favorable image.

The Petzval sum is represented by a sum of values acquired by dividing the refractive powers of the lenses by the respective refractive indices of the lenses. Accordingly, to achieve high optical performance while facilitating reduction in the lens total length as described above, arrangement of refractive powers allowing achievement of a desired lens total length and arrangement of lenses made of materials having appropriate refractive indices are important.

Thus, the zoom lens of each embodiment has the following configuration. The lens total length at the telephoto end is defined as Lt, and the focal length of the entire system at the telephoto end is defined as ft. The mean value of the refractive indices of materials of the negative lenses included in the second lens unit L2 is defined as N2an. The mean value of the refractive indices of materials of the negative lenses included in the entire system is defined as NAan. The mean value of the refractive indices of materials of the positive lenses included in the entire system is defined as NAap. Here, the following conditional expressions are satisfied.

$$0.60 < Lt/ft < 0.95 \quad (1)$$

$$1.84 < N2an < 2.00 \quad (2)$$

$$0.22 < NAan - NAap < 0.40 \quad (3)$$

Next, the technical meaning of each conditional expression is described. The conditional expression (1) is normalization of the lens total length at the telephoto end using the focal length of the entire system at the telephoto end. The conditional expression (2) and the conditional expression (3) appropriately define the refractive indices of materials of the lenses configuring the zoom lens to achieve the lens total length satisfying the conditional expression (1) and also achieve favorable optical performance.

If the lens total length with respect to the focal length of the entire system at the telephoto end is reduced falling short of the lower limit of the conditional expression (1), the refractive power of the second lens unit L2 is required to be strengthened. With this configuration, even if the refractive index of the material of the lens is identified such that the conditional expression (2) and the conditional expression (3) are satisfied, the image plane is shifted to the over side (overcorrection side).

If the lens total length at the telephoto end increases exceeding the upper limit of the conditional expression (1), it is difficult to reduce the size of the entire system. The focal length of the entire system at the telephoto end becomes small. Accordingly, to acquire a desired zoom ratio, the focal length of the entire system at the wide angle end is required to be reduced. If the focal length of the entire system at the wide angle end becomes short, the front lens effective diameter increases. Accordingly, it is difficult to reduce the size of the entire system.

If the mean refractive index of the materials of the negative lenses included in the second lens units L2 is reduced falling short of the lower limit of the conditional expression (2), the Petzval sum becomes strong on the negative side. Accordingly, the image plane becomes over in the entire zoom range. If the mean refractive index of the materials of the negative lenses included in the second lens units L2 becomes large exceeding the upper limit of the conditional expression (2), the materials become to have high dispersion. It is thus difficult to correct chromatic aberration mainly at the wide angle end.

If the difference between the mean refractive index of materials of the negative lenses of the entire system and the mean refractive index of materials of the positive lenses of the entire system is reduced falling short of the lower limit of the conditional expression (3), the Petzval sum becomes strong on the negative side, and the image plane becomes over in the entire zoom range. If the difference between the mean refractive index of materials of the negative lenses of the entire system and the mean refractive index of materials of the positive lenses of the entire system becomes large exceeding the upper limit of the conditional expression (3), the refractive indices of materials of the positive lenses become small. Accordingly, the curvatures of lens surfaces of the positive lens become prominent (the curvature radii become small), and the thickness of the lens becomes large to secure a required edge thickness. As a result, for instance, it is difficult to reduce the thickness of the entire system in a retracted state.

As described above, the total optical length at the telephoto end and the refractive index of each lens of the entire system are appropriately arranged so as to satisfy each conditional expression, thereby easily achieving a zoom lens whose entire system is small and which has a high zoom ratio. It is further desirable to configure the numerical ranges of the conditional expression (1) to the conditional expression (3) as follows.

$$0.80 < Lt/ft < 0.91 \tag{1a}$$

$$1.84 < N2an < 1.92 \tag{2a}$$

$$0.22 < NAan - NAap < 0.35 \tag{3a}$$

The foregoing configuration achieves a zoom lens where the lens total length is small, the entire system is small, the zoom ratio is high to approximately range from 15 to 20, and high performance is achieved.

The mean value of refractive indices of materials of the lenses included in the fourth lens unit L4 is defined as N4a. The focal length of the first lens unit L1 is defined as f1. The focal length of the second lens unit L2 is defined as f2. The amount of movement of the first lens unit L1 during zooming from the wide angle end to the telephoto end is defined as m1.

The amount of movement of the second lens unit L2 during zooming from the wide angle end to the telephoto end is defined as m2. The amount of movement of the lens unit during zooming from the wide angle end to the telephoto end is the difference between the position of the lens unit at the wide angle end on the optical axis and the position of the lens unit at the telephoto end on the optical axis. The sign of the amount of movement is defined as positive in the case where the lens unit is nearer to the image at the telephoto end than at the wide angle end, and the sign is defined as negative in the case where the lens unit is nearer to the object at the telephoto end than at the wide angle end.

The difference of amounts of movement is zero during reciprocating movement of the lens unit. In this case, it is favorable to satisfy at least one of the following conditional expressions.

$$NAan > 1.85 \tag{4}$$

$$NAap < 1.68 \tag{5}$$

$$N4a > 1.65 \tag{6}$$

$$0.32 < f1/ft < 0.56 \tag{7}$$

$$-0.094 < f2/ft < -0.062 \tag{8}$$

$$-0.4 < m2/m1 < 0.4 \tag{9}$$

Next, the technical meaning of each of the foregoing conditional expressions is described.

The conditional expression (4) and the conditional expression (5) appropriately define the mean refractive indices of materials of the negative lenses and the positive lenses that configure the entire system, respectively. If the mean refractive index of materials of the negative lenses included in the entire system becomes small falling short of the lower limit of the conditional expression (4) or if the mean refractive index of materials of the positive lenses included in the entire system becomes large exceeding the upper limit of the conditional expression (5), the Petzval sum becomes strong on the negative side. As a result, the image plane becomes over in the entire zoom range.

The conditional expression (6) appropriately defines the mean value of the refractive indices of materials of the lenses configuring the fourth lens unit L4. If the mean value of the refractive indices of materials of the lenses configuring the fourth lens unit L4 becomes small falling short of the lower limit of the conditional expression (6), the curvatures of the lens surfaces configuring the fourth lens unit L4 become prominent, and various aberrations increase. It is thus difficult to correct the various aberrations. Particularly, in the case where the fourth lens unit L4 serves as a focus lens unit, it is difficult to suppress variation in aberration during focusing.

The conditional expression (7) is normalization of the focal length of the first lens unit L1 using the focal length of the entire system at the telephoto end, and optimally defines the refractive power of the first lens unit L1.

If the focal length of the first lens unit L1 with respect to the focal length of the entire system at the telephoto end becomes small falling short of the lower limit of the conditional expression (7), the amount of movement of the first lens unit L1 during zooming becomes small. Accordingly, the lens total length is easily reduced. However, the spherical aberration and coma aberration increase at the telephoto end. It is thus difficult to correct the aberrations. If the focal length of the first lens unit L1 with respect to the focal length of the entire system at the telephoto end becomes large exceeding the upper limit of the conditional expression (7), the amount of movement of the first lens unit L1 becomes large during zooming. Accordingly, the lens total length at the telephoto end increases. As a result, it is difficult to reduce the camera thickness in the retracted state.

The conditional expression (8) is normalization of the focal length of the second lens unit L2 using the focal length of the entire system at the telephoto end to optimally define the refractive power of the second lens unit L2. If the absolute value of the focal length of the second lens unit L2 becomes small with respect to the focal length of the entire system at the telephoto end exceeding the upper limit of the conditional expression (8) (the negative refractive power becomes large), the effect of varying magnification of the second lens unit L2 becomes large. However, the Petzval sum becomes strong on the negative side, and the image plane becomes over in the entire zoom range.

If the absolute value of the focal length of the second lens unit L2 becomes large with respect to the focal length of the entire system at the telephoto end (the negative refractive power becomes small) falling short of the lower limit of the conditional expression (8), it is difficult to achieve a desired ratio of varying magnification through the second lens unit L2. Furthermore, the lens total length at the telephoto end increases. Accordingly, it is difficult to reduce the camera thickness in the retracted state.

The conditional expression (9) appropriately configures the ratio of the amount of movement of the first lens unit L1 and the amount of movement of the second lens unit L2 from the wide angle end to the telephoto end. If the absolute value of the amount of movement of the second lens unit L2 becomes large with respect to the absolute value of the amount of movement of the first lens unit L1 falling short of the lower limit of the conditional expression (9), contribution by the second lens unit L2 to magnification variation becomes large. However, the first lens unit L1 is apart from the aperture stop SP at the wide angle end. Accordingly, the front lens effective diameter becomes large, and it is difficult to reduce the size of the entire system.

If the absolute value of the amount of movement of the second lens unit L2 becomes large with respect to the absolute value of the amount of movement of the first lens unit L1 exceeding the upper limit of the conditional expression (9), contribution by the second lens unit to magnification variation becomes small, and it is difficult to acquire a desired zoom ratio. The contribution by the third lens unit L3 to magnification variation becomes large, and the manufacturing sensitivity of the third lens unit L3 becomes high, which is unfavorable.

To acquire a zoom lens where the lens total length is short, the entire system is small, and the optical performance is high with a zoom ratio approximately ranging from 15 to 20, the numerical ranges of the conditional expression (4) to the conditional expression (9) are more favorably configured as follows.

$$NAan > 1.88 \quad (4a)$$

$$NAap < 1.675 \quad (5a)$$

$$N4a > 1.67 \quad (6a)$$

$$0.35 < f1/ft < 0.48 \quad (7a)$$

$$-0.090 < f2/ft < -0.072 \quad (8a)$$

$$-0.3 < m2/m1 < 0.1 \quad (9a)$$

Next, an embodiment of a digital still camera that adopts a zoom lens described in each of the embodiments as an imaging optical system is described with reference to FIG. 13.

FIG. 13 illustrates a camera body 20, and an imaging optical system 21 that is a zoom lens described in any of Embodiments 1 to 6. A solid image pickup element 22 (photo-electric conversion element), such as a CCD sensor or a CMOS sensor, takes light of a subject image formed by the imaging optical system 21 incorporated in the camera body. A memory 23 records information corresponding to a subject image photo-electrically converted by the solid image pickup element 22. A finder 24 includes a liquid display panel, and is for observing the subject image formed on the solid image pickup element 22.

The zoom lens of the present invention is thus applied to the image pickup device, such as a digital still camera, thereby achieving an image pickup device having a small size and high optical performance.

Next, Numerical Examples 1 to 6, which correspond to the Embodiments 1 to 6 of the present invention, respectively, are described. In each Numerical Example, i indicates the order of an optical surface; the order is taken from the object side. A curvature radius ri is of the i-th optical surface (the i-th surface). An interval di is between the i-th surface and the (i+1)-th surface. A refractive index ndi and an Abbe number vdi are of the material of the i-th optical element for d-line.

In Numerical Examples, the value of d12 is minus, because the order is counted from the aperture stop and then the third lens unit in order from the object side to the image side. It is defined that k is the eccentricity, A4, A6, A8 and A10 are aspheric surface coefficients, and x is the displacement in the optical axis direction at a position with a height h from the optical axis with respect to the surface apex. The aspheric surface shape is represented as follows.

$$x = (h^2/R)/[1+[1-(1+k)(h/R)^2]^{1/2}] + A4h^4 + A6h^6 + A8h^8 + A10h^{10}.$$

Note that R is the paraxial curvature radius. For instance, representation of "E−Z" means "$10^{-Z}$". The last two surfaces in Numerical Examples are surfaces of an optical block, such as a filter or a faceplate. In each embodiment, the back focus (BF) is the distance that is from the lens final surface to the paraxial image plane and represented as an air conversion length. The lens total length is acquired by adding the back focus to the distance from the lens surface nearest to the object to the final lens surface. Table 1 illustrates correspondence to the above-mentioned conditional expressions in each Numerical Example.

Numerical Example 1

| Surface data | | | | | |
|---|---|---|---|---|---|
| Surface number | r | d | nd | vd | Effective diameter |
| 1 | 32.210 | 0.75 | 1.92286 | 18.9 | 19.87 |
| 2 | 23.138 | 3.04 | 1.49700 | 81.5 | 18.82 |
| 3 | 513.621 | 0.05 | | | 18.43 |
| 4 | 24.952 | 1.94 | 1.77250 | 49.6 | 17.64 |
| 5 | 88.711 | (Variable) | | | 17.19 |
| 6 | 169.819 | 0.40 | 2.00100 | 29.1 | 10.85 |
| 7 | 5.508 | 2.82 | | | 8.29 |
| 8 | −17.295 | 0.30 | 1.77250 | 49.6 | 8.15 |
| 9 | 16.374 | 0.05 | | | 8.20 |
| 10 | 11.025 | 1.80 | 1.95906 | 17.5 | 8.37 |
| 11 | −154.510 | (Variable) | | | 8.21 |
| 12 (Stop) | ∞ | −0.20 | | | 4.30 |
| 13* | 5.328 | 1.70 | 1.55332 | 71.7 | 4.34 |
| 14* | −14.724 | 0.05 | | | 4.15 |
| 15 | 3.755 | 1.20 | 1.51742 | 52.4 | 3.81 |

-continued

Surface data

| | | | | | |
|---|---|---|---|---|---|
| 16 | 7.547 | 0.30 | 2.00100 | 29.1 | 3.22 |
| 17 | 3.075 | 1.44 | | | 2.91 |
| 18 | ∞ | (Variable) | | | 2.86 |
| 19 | 10.172 | 2.08 | 1.48749 | 70.2 | 8.82 |
| 20 | −41.903 | 0.40 | 1.95906 | 17.5 | 8.73 |
| 21 | −1000.000 | (Variable) | | | 8.70 |
| 22 | ∞ | 0.80 | 1.51633 | 64.1. | 15.00 |
| 23 | ∞ | | | | 15.00 |
| Image plane | ∞ | | | | |

Aspheric surface data

Thirteenth surface $K = -4.61976e+000$  $A 4 = 2.75247e-003$
$A 6 = -2.19942e-004$  $A 8 = 1.03895e-005$
$A10 = -1.21944e-006$ Fourteenth surface $K = 2.21450e+001$  $A 4 = 8.22384e-004$

| | wide angle | intermediate | telephoto |
|---|---|---|---|
| Focal length | 4.43 | 26.28 | 67.10 |
| F-number | 3.61 | 5.78 | 7.01 |
| Half angle of view (degree) | 36.63 | 8.39 | 3.30 |
| Image height | 3.29 | 3.88 | 3.88 |
| Total lens length | 44.48 | 54.06 | 60.07 |
| BF | 3.82 | 10.70 | 4.53 |
| d5 | 0.41 | 14.03 | 19.18 |
| d11 | 16.88 | 3.87 | 0.45 |
| d18 | 5.27 | 7.35 | 17.80 |
| d21 | 2.29 | 9.17 | 3.00 |

Numerical Example 2

Surface data

| Surface number | r | d | nd | vd | Effective diameter |
|---|---|---|---|---|---|
| 1 | 32.426 | 0.72 | 1.85478 | 24.8 | 20.00 |
| 2 | 20.578 | 3.13 | 1.49700 | 81.5 | 18.40 |
| 3 | 633.043 | 0.05 | | | 17.40 |
| 4 | 24.271 | 1.92 | 1.69680 | 55.5 | 17.00 |
| 5 | 163.247 | (Variable) | | | 16.70 |
| 6 | −201.061 | 0.35 | 2.00100 | 29.1 | 10.40 |
| 7 | 5.795 | 2.60 | | | 8.20 |
| 8 | −15.803 | 0.30 | 1.71300 | 53.9 | 8.00 |
| 9 | 17.635 | 0.05 | | | 8.00 |
| 10 | 11.533 | 1.60 | 1.95906 | 17.5 | 8.10 |
| 11 | −141.723 | (Variable) | | | 7.90 |
| 12 (Stop) | ∞ | −0.20 | | | 4.27 |
| 13* | 5.154 | 1.70 | 1.55332 | 71.7 | 4.40 |
| 14* | −16.203 | 0.05 | | | 4.20 |
| 15 | 3.673 | 1.20 | 1.51742 | 52.4 | 3.90 |
| 16 | 7.844 | 0.30 | 2.00100 | 29.1 | 3.40 |
| 17 | 3.058 | 1.44 | | | 3.10 |
| 18 | ∞ | (Variable) | | | 3.03 |
| 19 | 10.421 | 2.08 | 1.48749 | 70.2 | 8.50 |
| 20 | −42.329 | 0.40 | 1.95906 | 17.5 | 8.50 |
| 21 | −1000.000 | (Variable) | | | 8.50 |
| 22 | ∞ | 0.80 | 1.51633 | 64.1 | 15.00 |
| 23 | ∞ | | | | 15.00 |
| Image plane | ∞ | | | | |

Aspheric surface data

Thirteenth surface $K = -1.04671e+000$  $A 4 = 2.79758e-004$
$A 6 = 9.47249e-006$ Fourteenth surface $K = -1.03394e+000$  $A 4 = 4.73790e-004$

| | wide angle | intermediate | telephoto |
|---|---|---|---|
| Focal length | 4.43 | 28.83 | 67.08 |
| F-number | 3.59 | 5.91 | 7.05 |
| Half angle of view (degree) | 36.61 | 7.65 | 3.31 |
| Image height | 3.29 | 3.88 | 3.88 |
| Total lens length | 43.75 | 54.53 | 59.57 |
| BF | 3.84 | 11.04 | 4.19 |
| d5 | 0.38 | 13.45 | 18.32 |
| d11 | 16.91 | 3.37 | 0.45 |
| d18 | 4.91 | 8.98 | 18.91 |
| d21 | 2.31 | 9.51 | 2.66 |

Numerical Example 3

Surface data

| Surface number | r | d | nd | vd | Effective diameter |
|---|---|---|---|---|---|
| 1 | 31.048 | 0.78 | 2.00069 | 25.5 | 20.60 |
| 2 | 19.109 | 3.25 | 1.49700 | 81.5 | 18.80 |
| 3 | 141.184 | 0.05 | | | 18.50 |
| 4 | 22.063 | 2.41 | 1.77250 | 49.6 | 18.00 |
| 5 | 177.570 | (Variable) | | | 17.60 |
| 6 | 137.889 | 0.50 | 1.88202 | 37.2 | 10.70 |
| 7* | 5.027 | 2.77 | | | 7.80 |
| 8 | −13.621 | 0.30 | 1.88300 | 40.8 | 7.50 |
| 9 | 22.801 | 0.05 | | | 7.60 |
| 10 | 11.942 | 1.50 | 1.95906 | 17.5 | 7.70 |
| 11 | −90.919 | (Variable) | | | 7.50 |
| 12 (Stop) | ∞ | −0.20 | | | 3.98 |
| 13* | 6.483 | 1.70 | 1.58313 | 59.4 | 4.00 |
| 14* | −8.495 | 0.05 | | | 4.10 |
| 15 | 3.891 | 1.30 | 1.48749 | 70.2 | 3.80 |
| 16 | 9.908 | 0.30 | 2.00100 | 29.1 | 3.20 |
| 17 | 3.172 | 1.44 | | | 2.90 |
| 18 | ∞ | (Variable) | | | 2.85 |
| 19 | 10.551 | 2.50 | 1.60342 | 38.0 | 9.30 |
| 20 | −25.180 | 0.40 | 1.95906 | 17.5 | 9.10 |
| 21 | −1000.001 | (Variable) | | | 9.10 |
| 22 | ∞ | 0.80 | 1.51633 | 64.1 | 15.00 |
| 23 | ∞ | | | | 15.00 |
| Image plane | ∞ | | | | |

Aspheric surface data

Seventh surface $K = 1.69006e-001$  $A 4 = -1.20550e-004$
$A 6 = -1.09784e-006$  $A 8 = -2.36591e-007$
$A10 = -3.17270e-008$ Thirteenth surface $K = -1.08987e+000$  $A 4 = -2.33937e-003$
$A 6 = -2.59651e-004$  $A 8 = 2.45247e-006$
$A10 = -8.17589e-006$ -continued Surface data Fourteenth surface K = 6.94130e+000     A 4 = −5.69584e−004
A 6 = −7.15103e−005  A 8 = −2.56602e−005

|  | wide angle | intermediate | telephoto |
|---|---|---|---|
| Focal length | 4.43 | 30.45 | 67.04 |
| F-number | 3.62 | 5.59 | 7.09 |
| Half angle of view (degree) | 36.63 | 7.25 | 3.31 |
| Image height | 3.29 | 3.88 | 3.88 |
| Total lens length | 41.76 | 54.16 | 60.60 |
| BF | 4.20 | 10.33 | 4.19 |
| d5 | 0.36 | 14.63 | 18.15 |
| d11 | 14.09 | 2.66 | 0.45 |
| d18 | 4.01 | 7.44 | 18.70 |
| d21 | 2.67 | 8.81 | 2.66 |

Numerical Example 4

Surface data

| Surface number | r | d | nd | vd | Effective diameter |
|---|---|---|---|---|---|
| 1 | 43.843 | 0.82 | 1.85478 | 24.8 | 22.20 |
| 2 | 23.753 | 3.69 | 1.49700 | 81.5 | 21.50 |
| 3 | −1211.288 | 0.05 | | | 21.30 |
| 4 | 25.725 | 2.54 | 1.77250 | 49.6 | 20.50 |
| 5 | 137.520 | (Variable) | | | 20.10 |
| 6 | 162.088 | 0.50 | 1.88202 | 37.2 | 11.30 |
| 7* | 5.365 | 2.81 | | | 8.30 |
| 8 | −20.637 | 0.30 | 1.80400 | 46.6 | 8.10 |
| 9 | 15.385 | 0.05 | | | 8.10 |
| 10 | 9.844 | 1.50 | 1.95906 | 17.5 | 8.20 |
| 11 | 57.376 | (Variable) | | | 8.00 |
| 12 (Stop) | ∞ | −0.20 | | | 3.68 |
| 13* | 5.918 | 1.70 | 1.58313 | 59.4 | 3.70 |
| 14* | −8.957 | 0.05 | | | 3.70 |
| 15 | 4.052 | 1.30 | 1.51742 | 52.4 | 3.40 |
| 16 | 17.056 | 0.30 | 2.00100 | 29.1 | 2.90 |
| 17 | 3.200 | 1.24 | | | 2.60 |
| 18 | ∞ | (Variable) | | | 2.69 |
| 19 | 12.096 | 2.20 | 1.69680 | 55.5 | 9.50 |
| 20 | −56.028 | 0.40 | 1.95906 | 17.5 | 9.40 |
| 21 | −1000.001 | (Variable) | | | 9.30 |
| 22 | ∞ | 0.80 | 1.51633 | 64.1 | 15.00 |
| 23 | ∞ | | | | 15.00 |
| Image plane | ∞ | | | | |

Aspheric surface data

Seventh surface

K = −2.69985e−001   A 4 = 2.43999e−004
A 6 = 1.65212e−005  A 8 = −7.23132e−007
A10 = 5.22978e−008

Thirteenth surface

K = −8.75786e−001   A 4 = −2.09980e−003
A 6 = −2.79828e−004 A 8= −3.09843e−007
A10 = −7.48654e−006

Fourteenth surface

K = 5.61518e+000    A 4 = −8.90401e−004
A 6 = −1.33402e−004 A 8 = −3.26735e−005

|  | wide angle | intermediate | telephoto |
|---|---|---|---|
| Focal length | 4.44 | 28.87 | 75.49 |
| F-number | 3.99 | 6.00 | 7.10 |

-continued

Surface data

|  | wide angle | intermediate | telephoto |
|---|---|---|---|
| Half angle of view (degree) | 36.55 | 7.64 | 2.94 |
| Image height | 3.29 | 3.88 | 3.88 |
| Total lens length | 44.07 | 58.25 | 63.62 |
| BF | 4.79 | 11.49 | 4.60 |
| d5 | 0.44 | 16.51 | 22.07 |
| d11 | 15.24 | 3.30 | 0.45 |
| d18 | 4.36 | 7.71 | 17.25 |
| d21 | 3.26 | 9.96 | 3.07 |

Numerical Example 5

Surface data

| Surface number | r | d | nd | vd | Effective diameter |
|---|---|---|---|---|---|
| 1 | 32.227 | 0.78 | 2.00069 | 25.5 | 21.80 |
| 2 | 19.857 | 3.44 | 1.49700 | 81.5 | 20.00 |
| 3 | 151.710 | 0.05 | | | 19.70 |
| 4 | 22.354 | 2.56 | 1.77250 | 49.6 | 19.20 |
| 5 | 158.994 | (Variable) | | | 18.80 |
| 6 | 132.504 | 0.50 | 1.88202 | 37.2 | 11.30 |
| 7* | 5.353 | 2.86 | | | 8.20 |
| 8 | −15.689 | 0.30 | 1.88300 | 40.8 | 8.00 |
| 9 | 18.824 | 0.05 | | | 8.00 |
| 10 | 11.395 | 1.50 | 1.95906 | 17.5 | 8.10 |
| 11 | −221.567 | (Variable) | | | 8.00 |
| 12 (Stop) | ∞ | −0.20 | | | 4.19 |
| 13* | 5.294 | 1.70 | 1.58313 | 59.4 | 4.30 |
| 14* | −13.290 | 0.05 | | | 4.10 |
| 15 | 3.749 | 1.30 | 1.51742 | 52.4 | 3.80 |
| 16 | 18.686 | 0.30 | 2.00100 | 29.1 | 3.20 |
| 17 | 3.219 | 1.44 | | | 2.90 |
| 18 | ∞ | (Variable) | | | 2.86 |
| 19 | 11.802 | 2.50 | 1.69895 | 30.1 | 9.20 |
| 20 | −17.688 | 0.40 | 1.95906 | 17.5 | 9.10 |
| 21 | −1000.001 | (Variable) | | | 9.00 |
| 22 | ∞ | 0.80 | 1.51633 | 64.1 | 15.00 |
| 23 | ∞ | | | | 15.00 |
| Image plane | ∞ | | | | |

Aspheric surface data

Seventh surface

K = 1.80237e−001    A 4 = −6.83839e−005
A 6 = 5.18200e−006  A 8 = −3.57803e−007
A10 = −5.52627e−009

Thirteenth surface

K = 4.23515e−001    A 4 = −1.05544e−003
A 6 = −3.11580e−005 A 8 = −1.70236e−007
A10 = −8.01979e−007

Fourteenth surface

K = −4.36369e+000   A 4 = 1.51246e−004
A 6 = 2.74533e−005  A 8 = −1.00760e−005

|  | wide angle | intermediate | telephoto |
|---|---|---|---|
| Focal length | 4.44 | 34.18 | 75.45 |
| F-number | 3.57 | 5.36 | 7.10 |

-continued

| Surface data | | | |
|---|---|---|---|
| Half angle of view (degree) | 36.58 | 6.47 | 2.94 |
| Image height | 3.29 | 3.88 | 3.88 |
| Total lens length | 44.21 | 55.22 | 61.97 |
| BF | 3.91 | 10.35 | 3.70 |
| d5 | 0.32 | 15.93 | 18.87 |
| d11 | 15.95 | 2.86 | 0.45 |
| d18 | 4.51 | 6.57 | 19.43 |
| d21 | 2.38 | 8.82 | 2.18 |

Numerical Example 6

| Surface data | | | | | |
|---|---|---|---|---|---|
| Surface number | r | d | nd | vd | Effective diameter |
| 1 | 38.757 | 0.82 | 2.00069 | 25.5 | 22.00 |
| 2 | 23.431 | 3.60 | 1.49700 | 81.5 | 21.30 |
| 3 | 493.160 | 0.05 | | | 21.00 |
| 4 | 26.249 | 2.62 | 1.77250 | 49.6 | 20.40 |
| 5 | 182.949 | (Variable) | | | 20.00 |
| 6 | −529.353 | 0.35 | 1.95375 | 32.3 | 10.70 |
| 7 | 5.574 | 2.64 | | | 8.30 |
| 8 | −20.632 | 0.30 | 1.77250 | 49.6 | 8.20 |
| 9 | 16.160 | 0.05 | | | 8.10 |
| 10 | 10.483 | 1.50 | 1.95906 | 17.5 | 8.30 |
| 11 | 211.625 | (Variable) | | | 8.20 |
| 12 (Stop) | ∞ | −0.20 | | | 3.71 |
| 13* | 5.949 | 1.70 | 1.58313 | 59.4 | 3.80 |
| 14* | −8.989 | 0.05 | | | 3.70 |
| 15 | 3.906 | 1.30 | 1.51742 | 52.4 | 3.40 |
| 16 | 19.524 | 0.30 | 2.00100 | 29.1 | 2.90 |
| 17 | 3.140 | 1.24 | | | 2.60 |
| 18 | ∞ | (Variable) | | | 2.66 |
| 19 | 11.226 | 2.50 | 1.69895 | 30.1 | 9.10 |
| 20 | −16.128 | 0.40 | 1.95906 | 17.5 | 9.00 |
| 21 | −1000.001 | (Variable) | | | 8.90 |
| 22 | ∞ | 0.80 | 1.51633 | 64.1 | 15.00 |
| 23 | ∞ | | | | 15.00 |
| Image plane | ∞ | | | | |

Aspheric surface data

Thirteenth surface

K = −8.83963e−001  A 4 = −2.08880e−003
A 6 = −2.77367e−004  A 8 = −3.44402e−006
A10 = −7.59740e−006

Fourteenth surface

K = 5.76579e+000  A 4 = −9.51443e−004
A 6 = −1.33177e−004  A 8 = −3.47176e−005

| | wide angle | intermediate | telephoto |
|---|---|---|---|
| Focal length | 4.43 | 28.51 | 75.47 |
| F-number | 4.01 | 6.21 | 7.10 |
| Half angle of view (degree) | 36.61 | 7.74 | 2.94 |
| Image height | 3.29 | 3.88 | 3.88 |
| Total lens length | 44.13 | 58.05 | 63.48 |
| BF | 4.92 | 11.47 | 4.18 |
| d5 | 0.55 | 16.89 | 23.00 |
| d11 | 15.67 | 3.63 | 0.45 |
| d18 | 3.77 | 6.83 | 16.62 |
| d21 | 3.39 | 9.95 | 2.66 |

TABLE 1

| | Conditional Expression (1) | Conditional Expression (2) | Conditional Expression (3) | Conditional Expression (4) | Conditional Expression (5) | Conditional Expression (6) | Conditional Expression (7) | Conditional Expression (8) | Conditional Expression (9) |
|---|---|---|---|---|---|---|---|---|---|
| Embodiment 1 | 0.895 | 1.887 | 0.300 | 1.931 | 1.631 | 1.723 | 0.474 | −0.088 | −0.205 |
| Embodiment 2 | 0.888 | 1.857 | 0.287 | 1.906 | 1.619 | 1.723 | 0.462 | −0.089 | −0.134 |
| Embodiment 3 | 0.904 | 1.883 | 0.295 | 1.945 | 1.650 | 1.781 | 0.454 | −0.082 | 0.055 |
| Embodiment 4 | 0.843 | 1.843 | 0.229 | 1.900 | 1.671 | 1.828 | 0.454 | −0.076 | −0.107 |
| Embodiment 5 | 0.821 | 1.883 | 0.274 | 1.945 | 1.671 | 1.829 | 0.414 | −0.075 | −0.044 |
| Embodiment 6 | 0.841 | 1.863 | 0.266 | 1.937 | 1.671 | 1.829 | 0.466 | −0.079 | −0.160 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-087524, filed Apr. 18, 2013, which is hereby incorporated by reference herein in its entirety.

What is claimed is:

1. A zoom lens, comprising, in order from an object side to an image side: a first lens unit having a positive refractive power; a second lens unit having a negative refractive power; a third lens unit having a positive refractive power; and a fourth lens unit having a positive refractive power, wherein intervals between adjacent lens units vary during zooming, and the first lens unit moves so as to be disposed nearer to an object at a telephoto end than at a wide angle end, and wherein
each of the first lens unit to the fourth lens unit has at least one negative lens, and conditional expressions $0.60 < Lt/ft < 0.95$ $1.84 < N2an < 2.00$ $0.22 < NAan - NAap < 0.40$ are satisfied where Lt is a lens total length at the telephoto end, ft is a focal length of an entire system at the telephoto end, N2an is a mean value of refractive indices of materials of negative lenses included in the second lens unit, NAan is a mean value of refractive indices of materials of negative lenses included in the entire system, and NAap is a mean value of refractive indices of materials of positive lenses included in the entire system.

2. The zoom lens according to claim 1, wherein conditional expressions $NAan > 1.85$ $NAap < 1.68$ are satisfied.

3. The zoom lens according to claim 1, wherein a conditional expression $N4a > 1.65$ is satisfied where N4a is a mean value of refractive indices of materials of lenses included in the fourth lens unit.

4. The zoom lens according to claim 1, wherein a conditional expression $0.32 < f1/ft < 0.56$ is satisfied where f1 is a focal length of the first lens unit.

5. The zoom lens according to claim 1, wherein a conditional expression $-0.094 < f2/ft < -0.062$ is satisfied where f2 is a focal length of the second lens unit.

6. The zoom lens according to claim 1, wherein the number of negative lenses included in the second lens unit is two or less.

7. The zoom lens according to claim 1, wherein a conditional expression $-0.4 < m2/m1 < 0.4$ is satisfied where
m1 is an amount of movement of the first lens unit during zooming from the wide angle end to the telephoto end, and
m2 is an amount of movement of the second lens unit during zooming from the wide angle end to the telephoto end.

8. An image pickup device, comprising: a zoom lens; and an solid image pickup element that receives light of an image formed by the zoom lens, wherein the zoom lens comprises, in order from an object side to an image side: a first lens unit having a positive refractive power; a second lens unit having a negative refractive power; a third lens unit having a positive refractive power; and a fourth lens unit having a positive refractive power, wherein intervals between adjacent lens units vary during zooming, and the first lens unit moves so as to be disposed nearer to an object at a telephoto end than at a wide angle end, and wherein
each of the first lens unit to the fourth lens unit has at least one negative lens, and conditional expressions $0.60 < Lt/ft < 0.95$ $1.84 < N2an < 2.00$ $0.22 < NAan - NAap < 0.40$ are satisfied where Lt is a lens total length at the telephoto end, ft is a focal length of an entire system at the telephoto end, N2an is a mean value of refractive indices of materials of negative lenses included in the second lens unit, NAan is a mean value of refractive indices of materials of negative lenses included in the entire system, and NAap is a mean value of refractive indices of materials of positive lenses included in the entire system.

* * * * *